US007657506B2

(12) United States Patent
Levin

(10) Patent No.: US 7,657,506 B2
(45) Date of Patent: Feb. 2, 2010

(54) METHODS AND APPARATUS FOR AUTOMATED MATCHING AND CLASSIFICATION OF DATA

(75) Inventor: Boris I. Levin, Rishon Le-Zion (IL)

(73) Assignee: Microsoft International Holdings B.V., Amsterdam (NL)

( * ) Notice: Subject to any disclaimer, the term of this patent is extended or adjusted under 35 U.S.C. 154(b) by 94 days.

(21) Appl. No.: 11/649,546

(22) Filed: Jan. 3, 2007

(65) Prior Publication Data
US 2007/0282827 A1   Dec. 6, 2007

Related U.S. Application Data

(60) Provisional application No. 60/756,139, filed on Jan. 3, 2006.

(51) Int. Cl.
*G06F 17/30* (2006.01)
*G06F 17/00* (2006.01)

(52) U.S. Cl. .................... 707/2; 707/104.1
(58) Field of Classification Search ............ None
See application file for complete search history.

(56) References Cited

U.S. PATENT DOCUMENTS

| 5,251,131 | A  | * | 10/1993 | Masand et al. ............ 704/9 |
| 6,137,911 | A  | * | 10/2000 | Zhilyaev .................. 382/225 |
| 6,393,427 | B1 | * | 5/2002  | Vu et al. .................... 707/101 |
| 6,668,256 | B1 | * | 12/2003 | Lynch ........................ 707/101 |
| 6,751,600 | B1 | * | 6/2004  | Wolin ........................ 706/12 |
| 2005/0108325 | A1 | * | 5/2005 | Ponte ......................... 709/203 |
| 2005/0149546 | A1 | * | 7/2005 | Prakash et al. ............. 707/101 |
| 2008/0195595 | A1 | * | 8/2008 | Masuyama et al. .......... 707/5 |

OTHER PUBLICATIONS

U.S. Appl. No. 60/756,150.
U.S. Appl. No. 60/756,139.
U.S. Appl. No. 60/815,623.
Levin, B., and Rosenstein, J. "Zoomix: Self-Learning Matching Technology". Jul. 2006.
"Master Data Quality". http://www.zoomix.com/mdq.asp.

* cited by examiner

*Primary Examiner*—Uyen T. Le
(74) *Attorney, Agent, or Firm*—Wolf, Greenfield & Sacks, P.C.

(57) ABSTRACT

A computer-implemented method for processing data includes receiving an initial set of records including terms describing respective items in specified categories. Based on the initial set of records, respective term weights are calculated for at least some of the terms with respect to at least some of the categories. Each term weight indicates, for a given term and a given category, a likelihood that a record containing the given term belongs to the given category. Upon receiving a new record, not included in the initial set, respective assignment metrics are computed for two or more of the categories using the respective term weights of the particular terms in the new record with respect to the two or more of the categories. The new record is classified in one of the two or more of the categories responsively to the assignment metrics.

17 Claims, 4 Drawing Sheets

METHODS AND APPARATUS FOR AUTOMATED MATCHING AND CLASSIFICATION OF DATA

CROSS-REFERENCE TO RELATED APPLICATION

This application claims the benefit of U.S. Provisional Patent Application 60/756,139, filed Jan. 3, 2006, which is incorporated herein by reference.

FIELD OF THE INVENTION

The present invention relates generally to data processing, and specifically to methods and systems for extracting information from collections of data.

BACKGROUND OF THE INVENTION

Companies and other organizations commonly maintain large quantities of data in different databases and in different formats (even within the same database). Data mastering—compiling diverse data into a single, unified database while eliminating duplication and errors—has become increasingly important in ensuring data quality and accessibility. A number of software-based tools are available for automated data mastering, such as Zoomix ONE, produced by Zoomix Data Mastering Ltd. (Jerusalem, Israel).

One of the challenges of data mastering is accurate matching and grouping of records. For example, enterprise databases frequently contain duplicated data records, in which the same entity (product, customer, etc.) is represented by multiple, non-identical records. These duplications, if uncorrected, can cause substantial wasted expense and adversely affect relations with customers and suppliers. Matching and grouping are also important in data cleansing (detection and correction of data errors) and categorization.

SUMMARY OF THE INVENTION

Embodiments of the present invention provide methods and systems for automated matching and classification of data records. These methods are capable of grouping together records on the basis of similar, but not identical, terms, and thus can detect and resolve duplicated records and correct errors. Novel techniques of data analysis and sorting that are described hereinbelow permit large data repositories to be classified, cleansed and sorted, quickly and efficiently. Although these techniques are described hereinbelow with particular reference to databases and processing of database records, the principles of some of these techniques may be applied, mutatis mutandis, to processing data of other types, both structured and unstructured.

There is therefore provided, in accordance with an embodiment of the present invention, a computer-implemented method for processing data, including:

receiving a set of records, each record including terms describing a respective item among a plurality of items described by the records;

computing respective correlation coefficients between pairs of non-identical terms among the terms in the records, responsively to a respective association between the non-identical terms in each pair, each such pair including a first term and a second term;

using the correlation coefficients, determining that both of a pair of the records, which includes a first record including the first term of one of the pairs of non-identical terms and a second record including the second term of the one of the pairs of non-identical terms, describe the same respective item; and combining the pair of the records into a single, unified record.

In some embodiments, computing the respective correlation coefficients includes determining a distance between the first and second terms based on differences between characters in the first and second terms in each of at least some of the pairs, and determining the correlation coefficients for the at least some of the pairs responsively to the distance. The method may include grouping the terms responsively to the distances, and assigning term identifiers to groups of terms such that a group of the terms within a given distance of one another share a common term identifier, wherein determining that both of the pair of the records describe the same respective item includes searching the set for matching records using the term identifiers. In a disclosed embodiment, grouping the terms includes computing a hash function over the terms, and determining the groups to which the terms are to be assigned responsively to the hash function.

In one embodiment, computing the respective correlation coefficients includes determining respective frequencies of occurrence of the terms in the records, assigning to the terms respective weights which increase as the respective frequencies decrease, and calculating the correlation coefficients based on the respective weights of the first and second terms. Additionally or alternatively, computing the respective correlation coefficients includes, upon determining that a given pair of the records describe the same respective item, establishing a correspondence between different terms that appear respectively in a given field of the first and second records in the given pair, and determining a correlation coefficient for the different terms responsively to the correspondence.

In a disclosed embodiment, combining the pair of the records includes correcting an error in at least one of the terms in at least one of the records. Additionally or alternatively, the method may include classifying the unified record in one of a plurality of specified categories based on the terms in the first and second records.

In another embodiment, the method includes identifying a multi-word term including two words occurring in sequence in a plurality of the records, and computing the respective correlation coefficients includes calculating a correlation coefficient for the multi-word term, for use in identifying at least one of the records that contains the multi-word term and describes the same respective item as at least one other of the records.

In a disclosed embodiment, the method includes, for at least some of the terms, computing respective Boolean location vectors, each such vector indicating one or more partitions of the set of the records in which a given term occurs, wherein determining that both of the pair of the records describe the same respective item includes applying a Boolean conjunction operation to the Boolean location vectors in order to identify at least one of the partitions in which to search for the records that match the first record, and finding the second record in the at least one of the partitions.

There is also provided, in accordance with an embodiment of the present invention, a computer-implemented method for processing data, including:

receiving a set of records, each record including words describing a respective item;

finding in a plurality of the records occurrences of a sequence of two or more of the words;

analyzing the occurrences of the sequence so as to identify the sequence as a multi-word term; and sorting the set of data records so as to group the data records containing the multi-word term.

Typically, sorting the set of data records includes defining the multi-word term as a value of an attribute of the records.

In disclosed embodiments, analyzing the occurrences of the sequence includes deriving an association rule between the two or more of the words responsively to the occurrences of the sequence in the records. Typically, deriving the association rule includes computing respective first frequencies of finding each of the two or more of the words within the records in the set, computing a second frequency of finding the two or more of the words together in the sequence, and determining the association rule by comparison of the second frequency to at least one of the first frequencies. Additionally or alternatively, deriving the association rule includes identifying multiple sequences of the words that occur in the records, and selecting one or more of the sequences that occur in at least a predetermined number of the records.

In another embodiment, analyzing the occurrences of the sequence includes identifying a three-word term.

There is additionally provided, in accordance with an embodiment of the present invention, a computer-implemented method for processing data, including:

receiving a set of records, each record including multiple terms that respectively define values of respective attributes of an item described by the record;

making a determination that a group of two or more of the records in which one or more of the terms, but not all of the terms, are identical all refer to a common item;

identifying, in first and second records in the group, an association between respective first and second terms that are not identical; and sorting the set of records so as to group the data records responsively to the association.

In one embodiment, the method includes determining, responsively to the association, that the first and second terms define a common value of a given attribute, even when the first and second terms are expressed in different languages. Typically, sorting the set of records includes computing a correlation coefficient indicative of a correlation between the first and second terms, and finding matching records in the set using the correlation coefficient.

There is further provided, in accordance with an embodiment of the present invention, a computer-implemented method for processing data, including:

receiving a set of target records, each target record including respective terms;

dividing the records into a plurality of partitions;

defining respective Boolean location vectors for the terms, each Boolean location vector including a plurality of bits corresponding respectively to the plurality of the partitions, each bit indicating, for a respective partition, whether a respective term appears in at least one of the target records in the respective partition;

receiving a source record to match to the target records, the source record including at least first and second terms;

applying a Boolean conjunction operation to the respective Boolean location vectors corresponding to the first and second terms so as to generate a result vector indicating one or more of the partitions in which to search for a match; and sorting the records in the one or more indicated partitions in order to find a record matching the source record.

Typically, the target records include fields, which contain the terms, and the Boolean location vectors indicate whether the respective term appears in a specified one of the fields in the target records.

In a disclosed embodiment, applying the Boolean conjunction operation includes identifying one or more further terms that approximately match the first term, and performing the Boolean conjunction operation over a disjunction of the Boolean location vectors that are defined for both the first term and the one or more further terms.

There is moreover provided, in accordance with an embodiment of the present invention, a computer-implemented method for processing data, including:

receiving an initial set of records including terms describing respective items in specified categories;

calculating, based on the initial set of records, respective term weights for at least some of the terms with respect to at least some of the categories, each term weight indicating, for a given term and a given category, a likelihood that a record containing the given term belongs to the given category;

receiving a new record, not included in the initial set, the new record including particular terms;

computing respective assignment metrics for two or more of the categories using the respective term weights of the particular terms in the new record with respect to the two or more of the categories; and classifying the new record in one of the two or more of the categories responsively to the assignment metrics.

In some embodiments, calculating the respective term weights includes computing, for the given term, a general probability of occurrence of the given term over all of the categories, and computing, for the given category, a specific probability of the occurrence of the given term in the records belonging to the given category, and determining the term weight responsively to a difference between the specific probability and the general probability for the given term with respect to the given category. Determining the term weight may include setting the term weight for the given term with respect to the given category to zero unless the specific probability is significantly higher than the general probability. Typically, setting the term weight includes determining, responsively to the general probability, a minimal number of occurrences of the given term within the given category that can be considered significant, and setting the term weight to a non-zero value only if the given term occurs in at least the minimal number of the records in the given category.

In a disclosed embodiment, computing the respective assignment metrics includes building a contingency table containing the term weights indexed by the terms and by the categories, and selecting the categories and term weights to use in computing the respective assignment metrics from the contingency table. Additionally or alternatively, computing the respective assignment metrics includes calculating, for each of the two or more of the categories, a respective sum of the respective term weights of the particular terms in the new record, and classifying the new record includes assigning the new record to the one of the two or more of the categories having the greatest respective sum. Typically, the records include multiple fields, and calculating the respective sum includes computing a weighted sum of the respective term weights over the multiple fields.

There is furthermore provided, in accordance with an embodiment of the present invention, apparatus for processing data, including:

a memory, which is arranged to hold a set of records, each record including terms describing a respective item among a plurality of items described by the records; and a processor, which is configured to compute respective correlation coefficients between pairs of non-identical terms among the terms in the records, responsively to a respective association between the non-identical terms in each pair, each such pair including a first term and a second term, and to determine, using the correlation coefficients, that both of a pair of the records, which includes a first record including the first term of one of the pairs of non-identical terms and a second record including the second term of the one of the pairs of non-identical terms, describe the same respective item, and to combine the pair of the records into a single, unified record.

There is also provided, in accordance with an embodiment of the present invention, apparatus for processing data, including:

a memory, which is arranged to hold a set of records, each record including words describing a respective item; and a processor, which is arranged to find in a plurality of the records occurrences of a sequence of two or more of the words, to analyze the occurrences of the sequence so as to identify the sequence as a multi-word term, and to sort the set of data records so as to group the data records containing the multi-word term.

There is additionally provided, in accordance with an embodiment of the present invention, apparatus for processing data, including:

a memory, which is arranged to hold a set of records, each record including multiple terms that respectively define values of respective attributes of an item described by the record; and a processor, which is arranged to make a determination that a group of two or more of the records in which one or more of the terms, but not all of the terms, are identical all refer to a common item, to identify, in first and second records in the group, an association between respective first and second terms that are not identical, and to sort the set of records so as to group the data records responsively to the association.

There is further provided, in accordance with an embodiment of the present invention, apparatus for processing data, including:

a memory, which is arranged to hold a set of target records, each target record including respective terms; and a processor, which is arranged to divide the records into a plurality of partitions, to define respective Boolean location vectors for the terms, each Boolean location vector including a plurality of bits corresponding respectively to the plurality of the partitions, each bit indicating, for a respective partition, whether a respective term appears in at least one of the target records in the respective partition, to receive a source record to match to the target records, the source record including at least first and second terms, to apply a Boolean conjunction operation to the respective Boolean location vectors corresponding to the first and second terms so as to generate a result vector indicating one or more of the partitions in which to search for a match, and to sort the records in the one or more indicated partitions in order to find a record matching the source record.

There is moreover provided, in accordance with an embodiment of the present invention, apparatus for processing data, including:

a memory, which is arranged to hold an initial set of records including terms describing respective items in specified categories; and a processor, which is arranged to calculate, based on the initial set of records, respective term weights for at least some of the terms with respect to at least some of the categories, each term weight indicating, for a given term and a given category, a likelihood that a record containing the given term belongs to the given category, to receive a new record, not included in the initial set, the new record including particular terms, to compute respective assignment metrics for two or more of the categories using the respective term weights of the particular terms in the new record with respect to the two or more of the categories, and to classify the new record in one of the two or more of the categories responsively to the assignment metrics.

There is furthermore provided, in accordance with an embodiment of the present invention, a computer software product, including a computer-readable medium in which program instructions are stored, which instructions, when read by the computer, cause the computer to receive a set of records, each record including terms describing a respective item among a plurality of items described by the records, and to compute respective correlation coefficients between pairs of non-identical terms among the terms in the records, responsively to a respective association between the non-identical terms in each pair, each such pair including a first term and a second term, and to determine, using the correlation coefficients, that both of a pair of the records, which includes a first record including the first term of one of the pairs of non-identical terms and a second record including the second term of the one of the pairs of non-identical terms, describe the same respective item, and to combine the pair of the records into a single, unified record.

There is also provided, in accordance with an embodiment of the present invention, a computer software product, including a computer-readable medium in which program instructions are stored, which instructions, when read by the computer, cause the computer to receive a set of records, each record including words describing a respective item, and to find in a plurality of the records occurrences of a sequence of two or more of the words, to analyze the occurrences of the sequence so as to identify the sequence as a multi-word term, and to sort the set of data records so as to group the data records containing the multi-word term.

There is additionally provided, in accordance with an embodiment of the present invention, a computer software product, including a computer-readable medium in which program instructions are stored, which instructions, when read by the computer, cause the computer to receive a set of records, each record including multiple terms that respectively define values of respective attributes of an item described by the record, and to make a determination that a group of two or more of the records in which one or more of the terms, but not all of the terms, are identical all refer to a common item, to identify, in first and second records in the group, an association between respective first and second terms that are not identical, and to sort the set of records so as to group the data records responsively to the association.

There is further provided, in accordance with an embodiment of the present invention, a computer software product, including a computer-readable medium in which program instructions are stored, which instructions, when read by the computer, cause the computer to receive a set of target records, each target record including respective terms, and to divide the records into a plurality of partitions, to define respective Boolean location vectors for the terms, each Boolean location vector including a plurality of bits corresponding respectively to the plurality of the partitions, each bit indicating, for a respective partition, whether a respective term appears in at least one of the target records in the respective partition, to receive a source record to match to the target records, the source record including at least first and second terms, to apply a Boolean conjunction operation to the respective Boolean location vectors corresponding to the first and second terms so as to generate a result vector indicating one or more of the partitions in which to search for a match, and to sort the records in the one or more indicated partitions in order to find a record matching the source record.

There is moreover provided, in accordance with an embodiment of the present invention, a computer software product, including a computer-readable medium in which program instructions are stored, which instructions, when read by the computer, cause the computer to receive an initial set of records including terms describing respective items in specified categories, and to calculate, based on the initial set of records, respective term weights for at least some of the terms with respect to at least some of the categories, each term weight indicating, for a given term and a given category, a likelihood that a record containing the given term belongs to the given category, to receive a new record, not included in the initial set, the new record including particular terms, to compute respective assignment metrics for two or more of the categories using the respective term weights of the particular terms in the new record with respect to the two or more of the categories, and to classify the new record in one of the two or more of the categories responsively to the assignment metrics.

The present invention will be more fully understood from the following detailed description of the embodiments thereof, taken together with the drawings in which:

DETAILED DESCRIPTION OF EMBODIMENTS

System Overview

Figure 1:
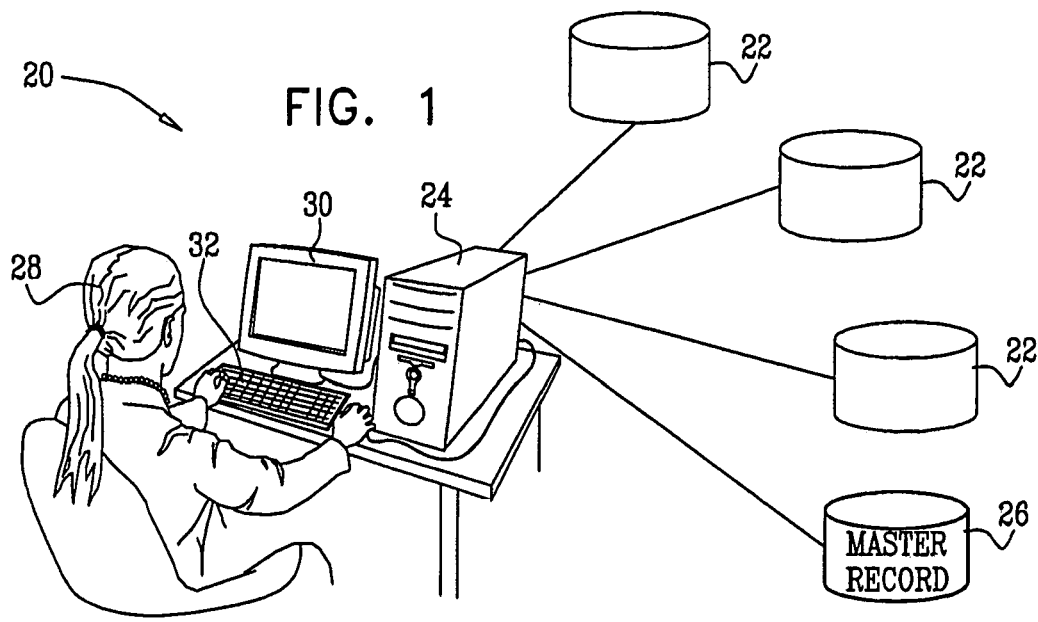
FIG. 1 is a block diagram that schematically illustrates a system for data mastering, in accordance with an embodiment of the present invention.

FIG. 1 is a block diagram that schematically illustrates a system 20 for data mastering, in accordance with an embodiment of the present invention. A record processor 24 reads data records from one or more source repositories 22, processes the records to eliminate duplication and errors, and then writes clean master data to a master repository 26. Processor 24 may also classifying uncategorized data records into a predetermined set of categories. Typically, repositories 22 and 26 comprise memory media, which contain databases. More generally, however, these repositories may contain data structures of other types, as well as unstructured data. Processor 24 typically comprises a general-purpose computer, which is programmed in software to carry out the functions described herein. The software may be downloaded to the processor in electronic form, over a network, for example, or it may alternatively be provided on tangible media, such as magnetic, optical or electronic memory media.

Processor 24 may perform a number of different functions on the data records in repositories 22. These functions may include, for example:

Automatic pattern detection, including recognition of multi-word terms and other associations between terms in the repositories.

Automatic attribute detection, including recognition of synonymous terms and transformation of unstructured data into structured attribute values.

Data cleansing, including matching duplicate records and correction of errors.

Automatic classification of records into categories, based on learning from user-defined examples.

Although processor 24 is described hereinbelow as performing all of these functions, in practice the processor may perform only a subset of the functions. Additionally or alternatively, the functions may be distributed over a number of different processors or systems.

Certain methods that may be used in performing the above functions are described in detail hereinbelow. These methods may be used in conjunction with other data mastering functions, such as automatic detection of patterns for classifying data types, and data normalization, in order to standardize the meanings and measures of attributes. Methods for automatic pattern detection of this sort are described, for example, in a U.S. patent application entitled, "Data Mastering System," filed on even date. Methods for data normalization are described, for example, in U.S. Provisional Patent Application 60/815,623, filed Jun. 20, 2006. Both of these applications are assigned to the assignee of the present patent application, and their disclosures are incorporated herein by reference.

Processor 24 performs some of the functions described above in interaction with a user 28. For example, the user may input instructions and accept or reject classification decisions made by the processor via a user interface, which typically comprises an input device, such as a keyboard 32 or a mouse (not shown), and an output device, such as a monitor 30. Processor 24 uses the information input by the user in order to refine its matching and classification rules, so that typically, less and less user interaction is required as the processing of the data in repositories 22 progresses.

For convenience and clarity, certain methods in accordance with embodiments of the present invention are described hereinbelow with reference to the data mastering functions of system 20. These methods may alternatively be applied, mutatis mutandis, in other areas in which data matching, cleansing and classification are used.

Matching and Cleansing of Data Records

Figure 2:
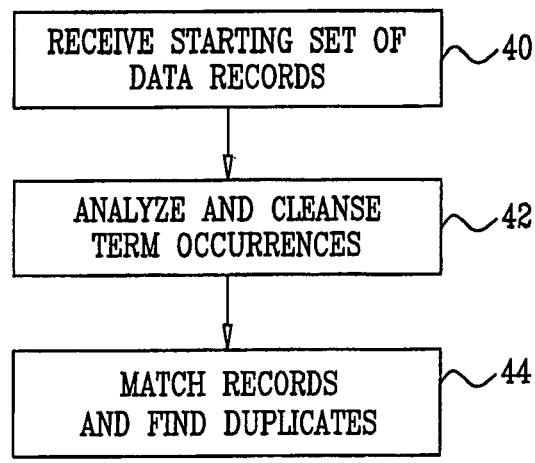
FIG. 2 is a flow chart that schematically illustrates a method for matching and cleansing of data records, in accordance with an embodiment of the present invention.

FIG. 2 is a flow chart that schematically illustrates a method for matching and cleansing of data records, in accordance with an embodiment of the present invention. Processor 24 begins the method by receiving a starting set of data records, at a starting step 40. These records serve as the basis for the processor to index and analyze the terms that appear in the fields of the records, at a term analysis step 42. This analysis then serves as the basis for matching records in repositories 22, at a matching step 44.

Records are considered to match if they appear, with high probability, to refer to the same data item, even if the terms in the records are not identical. Matching records may differ from one another due to differences in data format, term syntax and spelling, or errors in data entry. Upon finding matching records at step 44, processor 24 may present the records to user 28 and ask the user whether the records are duplicates. If so, the processor may mark or correct the records accordingly. Alternatively, if the processor finds that the probability of duplication between two records is sufficiently high, the processor may mark or correct the records automatically, without further user involvement.

Processor 24 typically uses a combination of factors in identifying matching records. In general, the processor assigns a weight to each term in the record, and uses the term weights in computing the probability of a match. The weight of a given term is typically inversely proportional to its frequency, so that rarer terms receive higher weights and make a greater contribution to the match probability. Processor 24 may also automatically identify and assign weights to multi-word terms, as described hereinbelow.

Additionally or alternatively, processor 24 may find correlations between different terms, and use these correlations in matching records. For example, the processor may use the Soundex algorithm for matching terms based on their phonetic proximity in the language in which the terms are recorded. As another example, the processor may calculate the correlation coefficients for pairs of terms in related fields of matched records. If the correlation coefficient is sufficiently high, indicating that certain terms are closely associated with one another, the processor may determine that the terms match even if they are expressed in different languages or different terminologies.

If the processor finds a number of duplicated records at step 44, it typically combines the records into one unified record in master repository 26. The processor may cleanse the data in the unified record by removing errors that may have occurred in one or more terms of one (or more) of the records, as well as expressing all values of a given attribute in a uniform manner. Furthermore, if the processor determines that a group of records all relate to the same data item, but the terms in different members of the group indicate values of different attributes, it may combine all the attribute values into a single, unified record, containing the union of the attribute values of the records in the group.

Details of the above techniques are described hereinbelow with reference to FIGS. 3-6.

Figure 3:
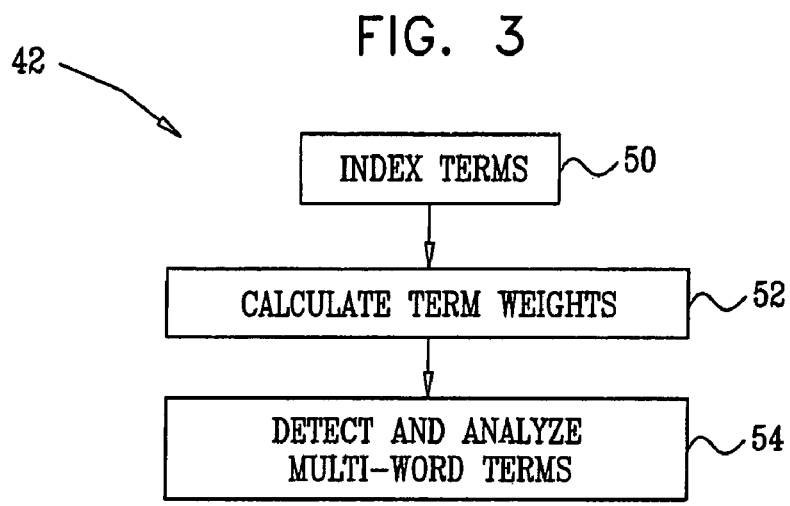
FIG. 3 is a flow chart that schematically illustrates a method for analyzing term occurrences in a set of data records, in accordance with an embodiment of the present invention.

FIG. 3 is a flow chart that schematically shows details of term analysis step 42, in accordance with an embodiment of the present invention. Although the steps in FIG. 3 are shown, for the sake of convenience, in a certain order, these steps may alternatively be carried out in a different sequence, as will be apparent from the description that follows. The order shown in FIG. 3 begins with indexing the terms that appear in the starting set of data records, at an indexing step 50. The step is described in detail hereinbelow with reference to FIG. 4. Briefly, at step 50, processor 24 finds the most frequent terms in each field of the records, and then groups each remaining term with the frequent term that it most closely matches. An index is computed for each term such that similar terms will have similar indices. In order to simplify subsequent record matching, a Boolean location vector may be computed for each term to indicate partitions of the database in which the term occurs.

Processor 24 computes a term weight for each term in the starting set of records, at a weight calculation step 52. Alternatively, the weights may be calculated over all records in a designated repository or repositories. The weight for each term is calculated per field (or for an aggregate of fields that are treated as a single field, if the user so indicates). As noted above, the basic idea of the weighting scheme is that the less frequent a term, the higher its weight. For this purpose, the frequencies for all terms per field are computed, giving an array of frequencies $\{f_i\}$ for terms i=1, ..., n. This array is sorted in ascending order of values $f_i$, so that $f_{i+1} \geq f_i$, i=1, ..., n-1.

The sorted array is divided into k parts, so that each part contains n/k terms. The inventor has found it effective, for example, to set k=5 if n≤500, or k=10 otherwise. Processor 24 then calculates the average value of frequency within the first part of the sorted array, $f_{av\_1}$, and the average value of frequency within the last (kth) part of the sorted array, $f_{av\_k}$. The processor also calculates weight parameters $w_{high}$ and $w_{low}$ corresponding to these frequency averages, such that the proportion between $w_{high}$ and $w_{low}$ is equal to the square root of the ratio between frequencies $f_{av\_k}$ and $f_{av\_1}$:

$$w_{high}:$$
$$\text{if } (f_{av\_1} < 1.001)$$
$$\quad w_{high} = 1;$$
$$\text{else}$$
$$\{$$
$$\quad \text{if } (f_{av\_1} <= 3)$$
$$\quad\quad w_{high} = 0.9;$$
$$\quad \text{else}$$
$$\quad\quad w_{high} = 0.8;$$
$$\}$$
$$w_{low}:$$
$$\quad \text{ratio} = f_{av\_k} / f_{av\_1};$$
$$\quad w_{low} = w_{high} / \sqrt{\text{ratio}};$$

Thus, for example, if the ratio between the frequencies $f_{av\_k}$ and $f_{av\_1}$ is 100:1, then the proportion between the corresponding weights $w_{low}$ and $w_{high}$ will be 1:10.

The weight $w_i$ for term i is calculated according to the formula:

$$W_i = \begin{cases} 1 + \dfrac{w_{high} - 1}{f_{av\_1} - 1} * (f_i - 1), & \text{if } f_i < f_{av\_1} \\ w_{high} + \dfrac{w_{low} - w_{high}}{f_{av\_k} - f_{av\_1}} * (f_i - f_{av\_1}), & \text{if } f_{av\_1} \leq f_i \leq f_{av\_k} \\ 0.01 + \dfrac{w_{low} - 0.01}{f_{av\_k} - f_n} * (f_i - f_n), & \text{if } f_i > f_{av\_k} \end{cases}$$ [equation (1)]

This formula gives the desired inverse dependence of term weight on term frequency. Alternatively, other weighting formulas may be used for this purpose, as will be apparent to those skilled in the art. The term weights are used in matching and classifying records, as described in detail hereinbelow, wherein terms with greater weights typically have a stronger influence on matching and classification decisions made by the processor.

Processor 24 identifies and analyzes multi-word terms, at a multi-word detection step 54. This step is described in detail hereinbelow with reference to FIG. 5. Briefly, at step 54, the processor finds all frequent multi-word term sequences within the data, either within a particular field or over all fields. A frequent multi-word sequence possesses the property that the frequency of the sequence of words within the data in question is substantially higher than the expected frequency calculated on the basis of individual frequencies of the words contained in this sequence. To identify these frequent sequences, processor 24 extracts and processes association rules from the data that reflect the relationships between words. Once the processor has identified these multi-word terms, it adds them to the collection of single-word terms for purposes of subsequent record matching and analysis.

Term Indexing

Figure 4:
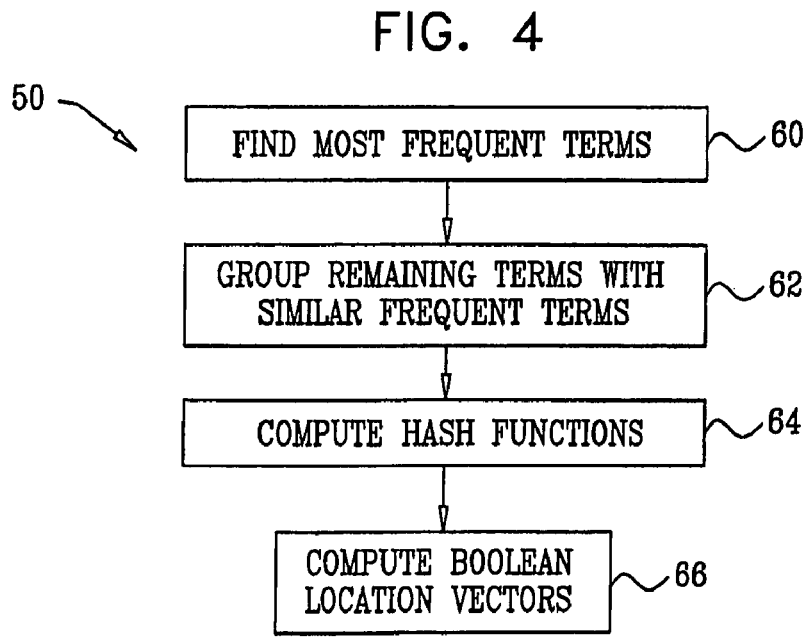
FIG. 4 is a flow chart that schematically illustrates a method for indexing terms occurring in a set of data records, in accordance with an embodiment of the present invention.

FIG. 4 is a flow chart that schematically shows details of indexing step 50, in accordance with an embodiment of the present invention. The aim of this step is to index all terms in a manner that facilitates finding distances between terms quickly and correctly, without reliance on a correlation dictionary. The indexing scheme takes into account substrings, spaces (or lack thereof) between words, and special (non-alphanumeric) characters, such as dash, comma, dot, etc. This indexing scheme is also helpful in fixing cases of suspected errors, such as spelling mistakes. For example, when association rules between different terms that co-occur in many records indicate that a certain record may contain an error, the indexing scheme can be used to determine the most probable values for missing or inaccurate data, and thus enhance the accuracy of record matching.

Processor 24 carries out the indexing procedure described below for each field separately. As a result of the procedure, the processor assigns each term a term identifier (TermID), which contains essential information on the term to which it is assigned. To begin the procedure, processor 24 finds the frequency of each term in the field in question, at a frequency finding step 60. A "term" is defined for this purpose as a string of characters occupying the entire field or a part of the field that is set off by a blank space at the beginning of the string, the end of the string, or both. As a result of the term frequency computation, the processor builds a table in which each row contains the following attributes:

Textual value (the characters in the string);
Length (the number of characters in the textual value);
Frequency.

The processor sorts the term table in decreasing order of frequency. In other words, if $f_i$ is the frequency of the ith textual value in the sorted table, then $f_i \geq f_{i+1}$. The total frequency is defined as $$F = \sum_{i=1}^{N} f_i,$$

wherein N is the total number of textual values in the table. The processor chooses a minimum bound for frequency, and thus delineates the most frequent terms as those above the bound. Various methods may be used to choose the bound, for example:

The minimum admissible frequency value $f_{bound}$ may be input by the user. (For instance, $f_{bound}=10$.)

The frequencies $f_i$ are sequentially summed (staring with i=1) until the sum reaches p*F, wherein p is a user-assigned parameter (for instance, p=0.9). The frequency $f_i$ at which the sum first reaches a value $\geq p*F$ is taken as $f_{bound}$.

The bound may be chosen for optimal discretization of the numeric sequence of frequencies $\{f_i\}$. In this case, the solution is the point $f_n = f_{bound}$ at which $$f_n = \max_{1=2,\ldots,N-1} G(n),$$

wherein $$G = \frac{(s_1)^2}{n} + \frac{(s_2)^2}{N-n},$$

and $s_1$ is the sum of $f_i$ such that $f_i \geq f_n$, while $s_2$ is the sum of $f_i$ such that $f_i < f_n$.

The processor assigns a respective group serial number (starting from 1) to each textual value whose frequency is greater than or equal to $f_{bound}$. Thus, each of the M most frequent textual values is assigned a respective group number.

Processor 24 examines the remaining (N−M) terms for similarity to one of the above groups, at a term grouping step 62. This step is useful in cleansing the set of terms, in the sense of recognizing that two (or more) slightly different terms probably mean the same thing, even if the terms are not identical due to errors or spelling anomalies. For this purpose, a similarity measure (referred to as a similarity code) between two strings A and B can be defined as follows:

TABLE I

SIMILARITY CODES

| Similarity level (Code) | Definition |
|---|---|
| 0 | The strings A and B completely coincide with each other. |
| 1 | The strings A and B completely coincide after deleting all special characters (such as dash, comma, dot, etc.) from both of these strings. |
| 2 | After deleting any special characters, the distance between strings A and B is equal to 1 (wherein distance between strings is measured as explained below). |
| 3 | After deleting any special characters, the distance between strings A and B is equal to 2. |
| 4 | After deleting any special characters, the distance between strings A and B is equal to 3. |

The distance between strings A and B is 1, if they differ by one character in one of the following ways:

Case 1. One character is included in the string A and is absent from the string B, or vice versa, for example, Moscow-Moscaow or Jerusalem-Jrusalem.

Case 2. Two adjacent characters in one string appear in reverse order in the other string, for example, Moscow-Mocsow.

Case 3. A character in one string is replaced by another character in the same position in the second string, for example, Moscow-Moscaw.

If string A can be transformed into string B by k steps of distance 1 (as defined above), then the distance between strings A and B is k. Alternatively, other sorts of similarity coding schemes and distance measures may be used, as are known in the art.

Processor 24 computes the TermID for each term using a hash function, at a hashing step 64. A string of n characters, $x_1 x_2 \ldots x_n$ (assumed to be in English) can be represented as a sequence of ASCII codes. (The Extended ASCII codes for capital English letters fall in the interval [65, 90], while lowercase English letters fall in the interval [97, 122], and numerical digits fall in the interval [48, 57].) Before applying the hash function, processor 24 may transform each upper or lower case letter $x_i$ into a corresponding output code $y_i \in \{1, \ldots, 26\}$, using the formula:

$$y_i = \begin{cases} x_i - 64 & \text{if } 65 \leq x_i \leq 90 \\ x_i - 96 & \text{if } 97 \leq x_i \leq 122 \end{cases} \quad (2)$$

For blank, the code 0 may be used. Alternatively, a table C[ ] may be used to transform ASCII codes into output codes $y_i$, wherein only frequent letters receive unique (individual) codes, while rare letters may share joint codes. Other coding schemes may alternatively be used, as will be apparent to those skilled in the art.

Typically, the hash function that is applied to a given string depends on the length n of the string. An exemplary set of length-dependent hash functions is presented below in Appendix A. Processor 24 uses the hash functions to build a corresponding hash table HT[ ]. For a given string $x_1 \ldots x_k$ of k characters (after deleting the above-mentioned special symbols), the value of the hash function v may be calculated as follows:

$$v = \begin{cases} h_1(x_1 \ldots x_k) & \text{if } k \leq 4 \\ S_{k-3} + h_{k-3}(x_1 \ldots x_k) & \text{if } 5 \leq k \leq 10 \\ S_8 + h_8(x_1 \ldots x_k) & \text{if } k > 10 \end{cases} \quad (3)$$

Wherein the hash functions $\{h_1 \ldots h_n\}$ are defined in Appendix A, and $S_j$ is a parameter chosen to maintain uniqueness of the hash functions. For example, $S_j$ may be chosen from the following table, depending on j:

TABLE II

HASH PARAMETERS

| | | |
|---|---|---|
| $S_2$ | 531441 | 531441 |
| $S_3$ | $531441 + P_2$ | 1031450 |
| $S_4$ | $S_3 + P_3$ | 1532451 |
| $S_5$ | $S_4 + P_4$ | 2034464 |
| $S_6$ | $S_5 + P_5$ | 2536893 |
| $S_7$ | $S_6 + P_6$ | 3040106 |
| $S_8$ | $S_7 + P_7$ | 3544035 |

Exemplary values of the prime numbers $P_j$ are listed in Appendix A. In this example, the hash table HT[ ] contains $S_8 + P_8 = 4047982$ rows, and the memory needed for this table is 16 Mb.

For each of the frequent terms found at step 60, the hash table entry HT[v] contains the corresponding group number. When processor 24 receives a new term to index, it applies function (3) to the term in order to compute the corresponding v. If HT[v]≠0, then HT[v] is the group number for the string whose hash function value is equal to v. If HT[v]=0, there is no group to which a string having the value v of the hash function belongs. In this case, the processor searches for the group that the new term most nearly matches, as described further hereinbelow. When no near match is found either, the processor may define a new group based on the new term, with a corresponding new entry in the hash table.

Processor 24 applies the group number in constructing the TermID for each term as follows:

$$\text{TermID} = D_1 D_2 D_3 D_4 D_5 D_6 D_7 D_8 D_9 D_{10} \quad (4)$$

Here $D_i$, $i=1, \ldots, 10$, are decimal digits, wherein $D_2 D_3 D_4 D_5 D_6$ is the group number. $D_1$ is the similarity code, as determined by the distance (as defined above) between the present term and the group $D_2 D_3 D_4 D_5 D_6$. In particular, if the term in question exactly corresponds to the group $D_2 D_3 D_4 D_5 D_6$, then $D_1 = 0$. The maximum value of $D_1$ is 4, as shown above in Table I.

$D_7 D_8 D_9 D_{10}$ is the value of a special hash function, which is calculated as follows: Given a string $x_1 x_2 \ldots x_n$ of n characters, processor 24 deletes all special characters and all vowels, leaving the sequence $\hat{x}_1 \ldots \hat{x}_m$ of consonants. The processor transforms each of the first three characters $\hat{x}_1, \hat{x}_2, \hat{x}_3$ into a corresponding code $z_1, z_2, z_3$, wherein $z_i \in \{1, \ldots, 20\}$, using a coding table $\hat{C}[\ ]$. (For blank, the processor uses the code 0.) The processor then sets $D_7 D_8 D_9 D_{10}$ to the value $v_c$ of the hash function:

$$v_c = z_1 + 21 * z_2 + 441 * z_3 \quad (5)$$

The maximum possible value of this function is 9260.

After applying the above hashing process to all of the frequent terms that were found at step 60, processor 24 can create a table containing the following information for each of the groups of terms:

Group number;
Textual value;
Total number of character;
Number of characters not including special characters (dash, comma, dot, etc.);
Hash function value (equation (3));
Value of the hash function for consonants (equation (5)).

The processor may assign the group numbers after sorting all the frequent strings in ascending order of length (possibly after first deleting the special characters). The processor may then create the array G[j], in which each entry is the last (i.e., greatest) group number for strings of the length j. Thus, after indexing, the length of any string can be determined by comparing the corresponding group number to the entries in G[j].

In order to group each new term at step 62 and determine the TermID at step 64 for each new term that it receives, processor 24 computes the hash function value v (equation (3)) of the term and then looks up HT[v]. If HT[v]≠0, then HT[v] is $D_2 D_3 D_4 D_5 D_6$ in the TermID to be created, and $D_1 = 0$. $D_7 D_8 D_9 D_{10}$ is equal to the calculated value of the hash function for consonants (equation (5)).

If HT[v]=0 for the new term, then the processor attempts to find the nearest group to the present term, up to a maximum distance of 3 (as defined above in Table I). Methods of approximate string matching that are known in the art may be used for this purpose. Typically, the processor transforms the term into various new strings by changing a single character in the manner described above. The processor then checks each of the new strings to determine whether HT[v]≠0 for the transformed string. If so, then the TermID is given by $D_1 = 1$, $D_2 D_3 D_4 D_5 D_6 = HT[v]$, and $D_7 D_8 D_9 D_{10}$ is given by equation (5). This search proceeds up to three character transformations, which will yield a TermID with $D_1 = 3$. Alternatively, fewer transformations may be allowed for shorter strings, and/or more transformations for longer strings. The special hash function $D_7D_8D_9D_{10}$ can be useful in locating groups that are near-matches to the present term for purposes of matching by transformation. For example, in order to limit the range of search for near-matches, the above-mentioned transformations and search may be performed only over strings that share the same value of the special hash function.

Processor 24 may also detect cases in which a space was omitted between words, so that a given term is actually two terms that are conjoined into a single string. For this purpose, the processor may successively breaks the string into different fragments, and then attempts to match the fragments to terms in the group table. A systematic method for performing this sort of splitting and matching is presented below in Appendix B.

To facilitate subsequent matching of records, processor 24 determines a Boolean location vector for each term in each field, at a vector computation step 66. The terms are then recorded in a target table containing the following attributes:

[TermID]—as calculated above.
[TextualValue]—the actual string corresponding to the term.
[FieldID]—identifying the field in the records in which the term appears.
[BooleanLocationVector]—determined as described below.

To compute the value of BooleanLocationVector, the target table is virtually partitioned into k parts, wherein each part contains m=N/k records, and N is the total number of records. In the examples below, k=32, but larger or smaller values may be chosen as appropriate and convenient. BooleanLocationVector is an array of bits BooleanLocationVector[i], i=1, ..., k, wherein BooleanLocationVector[i]=1 for a given table entry if the corresponding TermID occurs in the field identified by FieldID in ith partition of the target table. Otherwise, BooleanLocationVector[i]=0. For example, the BooleanLocationVector:

TABLE III

| BOOLEAN LOCATION VECTOR | | | | | | | | | | | | | | | | | | | |
|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | ... |
| 1 | 0 | 0 | 0 | 1 | 0 | 0 | 0 | 1 | 1 | 0 | 0 | 0 | 0 | 0 | 0 | 0 | 0 | 0 | ... | indicates that the TermID in the FieldID in question appears in partitions 1, 5, 9, 10, .... A method for efficient term matching using Boolean location vectors is described hereinbelow with reference to FIG. 6.

Detecting Multi-Word Terms

Figure 5:
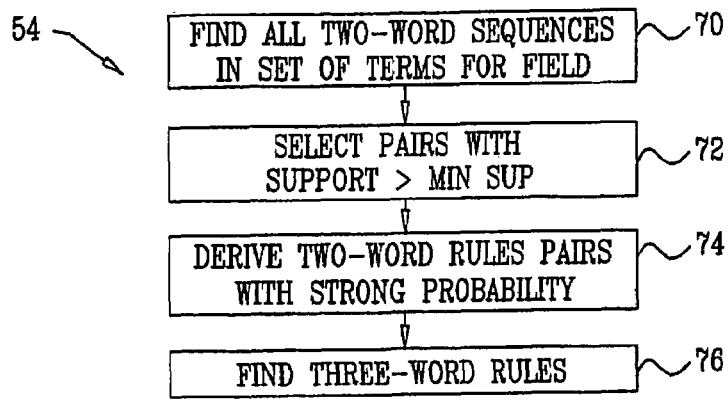
FIG. 5 is a flow chart that schematically illustrates a method for identifying multi-word terms, in accordance with an embodiment of the present invention.

FIG. 5 is a flow chart that schematically shows details of multi-word detection step 54, in accordance with an embodiment of the present invention. The method shown in FIG. 5 uses association rules that reflect the relationships between words in order to identify the corresponding multi-word terms. To illustrate this concept, assume that there are k distinct words $\{W_1, \ldots, W_k\}$ that occur in a given field over all the records in question, with a corresponding set of TermIDs. If $n_i$ is the frequency of word $W_i$, then $$\sum_{i=1}^{k} n_i = N,$$

wherein N is the total number of words that occur within the given field over all the records under consideration.

Association rules for two-word terms $(W_1, W_2)$ can be formulated in two ways:

If $W_1$ is the first word in a two-word sequence, (6)
    then the second word in this sequence is $W_2$.
If $W_2$ is the second word in a two-word sequence, (7)
    then the first word in this sequence is $W_1$.

Each such rule has probability p and support m (equal to the number of cases in which the sequence $(W_1, W_2)$ occurs). The probability for rule (6) above is $$p = \frac{m}{n_1},$$

wherein $n_1$ is the frequency of the word $W_1$ in the field in question, while the probability for rule (7) is $$p = \frac{m}{n_2}.$$

Although theoretically, the words in a given field may be characterized by a great many association rules, processor 24 typically considers only those rules that satisfy the following two necessary conditions:

1) The support of the rule in the field in question must be no less than a user-defined minimum support (minsup), i.e., m≧minsup.
2) The probability of the rule p must be no less than a minimum admissible probability $p_{min}$, i.e., $p \geq p_{min}$. Alternatively, a confidence level may be used instead of the probability, and must be no less than a certain minimum confidence (minconf).

For each rule, processor 24 can calculate a significance level β and error probability α. The significance level β=1−α can be interpreted as a designation of the extent to which the rule can be trusted. The error probability α is the probability that the rule in the given data set exists accidentally. Formally, the error probability is calculated by the hypergeometric distribution law as follows:

$$\alpha = \sum_{k=m}^{\min(n_1, n_2)} P(N, n_2, n_1, k) \tag{8}$$

wherein $$P(N, n_2, n_1, k) = \frac{C_{n_2}^{k} \cdot C_{N-n_2}^{n_1-k}}{C_N^{n_1}},$$

and $C_i^j$ are the well-known binomial coefficients.

To find all two-word terms in a given field in the data set, processor 24 identifies all two-word sequences in the set of terms appearing in the field over all the records, at a sequence finding step 70. The processor computes the support of each of the sequences. The results of this computation may be presented in the form of a contingency table:

TABLE IV

TWO-WORD CONTINGENCY TABLE

| Words | $W_1$ | $W_2$ | ... | $W_j$ | ... | $W_k$ |
|---|---|---|---|---|---|---|
| $W_1$ | $m_{11}$ | $m_{12}$ | | $m_{1j}$ | | $m_{1k}$ |
| $W_2$ | $m_{21}$ | $m_{22}$ | | $m_{2j}$ | | $m_{2k}$ |
| ... | | | | | | |
| $W_i$ | $m_{i1}$ | $m_{i2}$ | | $m_{ij}$ | | $m_{ik}$ |
| ... | | | | | | |
| $W_k$ | $m_{k1}$ | $m_{k2}$ | | $m_{kj}$ | | $m_{kk}$ |

Processor 24 scans the results of the support computation, and selects only those pairs $(W_i, W_j)$ for which $m_{ij} \geq \min \sup$, at a pair selection step 72. For each such pair, the processor calculates the probabilities:

$$p_j = \frac{m_{ij}}{n_j} \qquad (9)$$

$$p_i = \frac{m_{ij}}{n_i} \qquad (10)$$

The processor compares these values with the applicable minimum admissible probability. Based on this comparison, the processor derives the two-word association rules that have strong probability, at a rule identification step 74. Alternatively or additionally, the processor may compute a confidence value and compare it to a minimum admissible confidence, as described hereinbelow.

For a given word $W_i$, the minimum admissible probability $p_{min}^{(i)}$ may be calculated as follows:

$$p_{min}^{(i)} = \frac{(k_{min} - 1) \cdot \tilde{p}_i + 1}{k_{min}} \qquad (11)$$

Here $$\tilde{p}_i = \frac{n_i}{N},$$

and $k_{min}$ is a user-defined parameter specifying how much of the interval $[\tilde{p}_i, 1]$ should be added to $\tilde{p}_i$ in order to receive the minimum admissible value $p_{min}^{(i)}$ for probability. Note that the value of equation (11) is always greater than $1/k_{min}$ and does not exceed 1.

If $p_j \geq p_{min}^{(i)}$ (wherein $p_j$ is calculated according to equation (9)), then processor 24 identifies an association rule of the form of rule (7):

If $W_j$ is the second word in a two-word sequence, then the first word in this sequence is $W_i$.

Alternatively or additionally, if $p_i \geq p_{min}^{(j)}$ (wherein $p_i$ is calculated according to equation (10)), then the converse rule applies, in the form of rule (6). Processor 24 records the sequence of words $(W_i, W_j)$ as a two-word term at step 74 if at least one of the applicable rules has sufficient probability and support.

Optionally, processor 24 may apply further analysis to choose only those two-word association rules that have a high level of confidence. For this purpose, the processor may assign each pair a rank $R(W_i, W_j)$ depending on the "strength" of the corresponding association rule or rules. For example, $R(w_i, w_j)$ may be based on the relative difference between the probability of the rule $p_j$ (or equivalently $p_i$) and the minimum admissible probability $p_{min}^{(i)}$:

$$R = \frac{1 + p_j - 2 \cdot p_{min}^{(i)}}{2 \cdot (1 - p_{min}^{(i)})} \qquad (12)$$

If for a given sequence $(W_i, W_j)$, both of the association rules (6) and (7) have been found to meet the criteria of support and probability, then the rank R for this two-word term is calculated as the sum of the values of R for the two rules. Processor 24 accepts a sequence $(W_i, W_j)$ as a two-word term if the rank R for this sequence is not less than a predetermined minimum admissible value $R_{min}$. Typically, $R_{min} = 0.5$, although higher or lower values may also be used.

After identifying the two-word terms in the records, processor 24 goes on to define association rules for three-word terms, at a three-word rule identification step 76. Three-word terms are identified by association rules containing two conditions, such as:

If $W_1$ is the first word in a three-word sequence, and at the same time $W_2$ is the second word in this three-word sequence, then the third word in this sequence is $W_3$.

If $W_2$ is the second word in a three-word sequence, and at the same time $W_3$ is the third word in this three-word sequence, then the first word in this sequence is $W_1$.

Processor 24 scans the terms appearing in the field of interest in order to find all word pairs for which $m_{ij} \geq \text{minsup}$ (as illustrated above in Table IV). The processor records the pairs in a temporary array A[l].first_wordID.second_wordID, l=1, ..., L, wherein L is the total number of pairs satisfying the condition $m_{ij} \geq \text{minsup}$. To find three-word association rules of the first type listed above, the processor builds a new contingency table between the set of words $\{W_i, i=1, ..., k\}$ and the set of word pairs recorded in array A. In this contingency table, $m_{il}$ denotes the number of three-word sequences in which the first word is $W_i$, and l is the serial number (in the array A) of the pair of words following $W_i$. If $m_{il} \geq \text{minsup}$, and $$p_1 = \frac{m_{il}}{n_l} \geq p_{min}^{(i)}$$

(wherein $n_l$ is the frequency of the lth pair of words in A), then the following three-word association rule may be asserted:

If the second and the third words in a three-word sequence form the lth pair of words in the array A, then the first word in this sequence is $W_i$.

Assuming that the lth record in the array A is the pair $(W_2, W_3)$, processor 24 will accept this three-word association rule if a two-word association rule of type (7) with $W_2$ in the "if" part and $W_i$ in the "then" part does not already exist, or if the two-word association rule exists only with lower probability $p_1$ that is less than the probability p of the three-word rule. Typically, processor 24 adds a probability margin to this calculation, whereby the three-word association rule may be adopted. (and the corresponding three-word term identified) if p is greater than $p_1$ by at least some minimum fraction, for example, $p \geq 1.05 \cdot p_1$.

To find three-word association rules of the second kind listed above, processor 24 constructs another contingency table between the set of word pairs in array A and the set of words $\{W_i, i=1, \ldots, k\}$ that are found to follow each word pair. The processor uses the support and probability of the three-word sequences defined by the contingency table to find three-word association rules, in a manner analogous to that described above.

Processor 24 identifies the sequence of words ($W_1$, $W_2$, $W_3$) as a three-word term if it finds that at least one of the corresponding three-word association rules, as defined above, meets the applicable probability criteria. A ranking criterion may also be used, in analogy to equation (12), to evaluate the "strength" of the three-word terms.

In matching pairs of records at step 44 (FIG. 2), processor 24 uses correlation coefficients $c_i$ to evaluate the strength of matching between pairs of non-identical terms across the two records. For identical terms, $c_i=1$. For non-identical terms, the correlation coefficient indicates the likelihood that the terms actually denote the same attribute value. Methods for computation and use of these correlation coefficients are described further hereinbelow. Processor 24 computes the specific correlation coefficients between multi-word terms and the individual words making up the terms as part of the process of detecting and analyzing the multi-word terms at step 54. These coefficients indicate the likelihood that when one of the words in the two-word term appears in a record, it is actually a fragment of the two-word term.

For each two-word term $W_iW_j$, processor 24 initially sets the correlation coefficient $c_i$ between the term $W_i$ and the term $W_iW_j$ to the value:

$$c_i = \frac{2}{2 + \sqrt{\frac{n_i}{n_j}}} \quad (13)$$

wherein $n_i$ and $n_j$ are defined as above. Coefficient $c_j$ between $W_j$ and $W_iW_j$ is computed in analogous fashion. The values of $c_i$ and $c_j$ are then corrected using the rank value $R(W_i, W_j)$ defined by equation (12) to give the corrected correlation value:

$$\hat{c}_i = c_i + (0.99 - c_i) * (2 \cdot R_i - 1) \quad (14)$$

wherein $$R_i = \frac{1 + p_i - 2 \cdot p_{min}^{(j)}}{2 \cdot (1 - p_{min}^{(j)})},$$

and likewise for $\hat{c}_j$.

Matching Records

Figure 6:
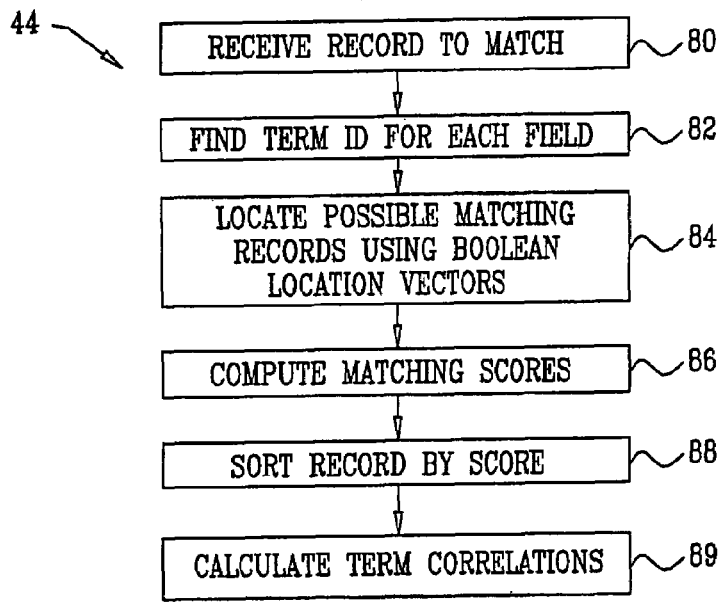
FIG. 6 is a flow chart that schematically illustrates a method for matching and grouping data records, in accordance with an embodiment of the present invention.

FIG. 6 is a flow chart that schematically shows details of matching step 44, in accordance with an embodiment of the present invention. As noted above, at this step, processor 24 identifies records that have a high probability of referring to identical data items, notwithstanding differences in some of the terms contained in the records. Records that are found to refer to identical data items may be unified, in order to eliminate duplications. Matching records may also be used in identifying correspondences between certain attributes or attribute values that may be expressed in different terms among different sets of records.

The method of FIG. 6 is assumed to take place after processor 24 has indexed the terms in a target set of records (including multi-word terms), computed Boolean location vectors, and calculated the term weights, as described above. (The target set may, in the present example, be taken to be the starting set of records that was received at step 40, although the method of FIG. 6 may be used in matching any suitably-indexed set of records.) The processor receives a new record to match to the target set, at a record input step 80. To facilitate matching, the processor computes the TermID for each term in each field of the new record, at a TermID computation step 82. The TermID is computed using hash functions in the manner described above. Each TermID is associated with a FieldID indicating the field of the record in which the term was found.

Processor 24 searches for records that match the new record using Boolean location vectors, at a vector location step 84. At this step, the processor applies a Boolean conjunction operation to the Boolean location vectors of the terms in the appropriate fields of the target set in order to identify the partitions of the target set of records in which there may be records that match the new record. In this manner, using a simple Boolean computation, the processor is able to eliminate most of the records from consideration, and thus focus the more computation-intensive matching process on only a small portion of the target set.

By way of example, we assume that processor 24 seeks to match a source record having certain terms in certain fields, as illustrated in the following table:

TABLE V

| SOURCE RECORD | | | | |
|---|---|---|---|---|
| FieldID1 | FieldID2 | FieldID3 | FieldID4 | FieldID5 |
| TermID1 | TermID2 | TermID3 | TermID4 | TermID5 |

We further assume that fields 1-5 of the source record are to be compared to the following target fields in the target table (source⇒target): FieldID1⇒FieldID1; FieldID2⇒FieldID5; FieldID3⇒FieldID6; FieldID4⇒FieldID7; FieldID5⇒FieldID9. The occurrences of terms 1-5 in these target fields are assumed to have been previously mapped to respective Boolean location vectors {BLV1, ..., BLV5} at step 66 (FIG. 4)

(TermID1, FieldID1)⇒BLV1;
(TermID2, FieldID5)⇒BLV2;
(TermID3, FieldID6)⇒BLV3;
(TermID4, FieldID7)⇒BLV4;
(TermID5, FieldID9)⇒BLV5.

The bitwise conjunction of these Boolean vectors is:

$$\bar{V} = (BLV1) \& (BLV2) \& (BLV3) \& (BLV4) \& (BLV5) \quad (15)$$

Assuming the set of records has been divided into k=32 partitions (as described above), $\bar{V}$ is 32-bit vector such that if $\bar{V}=0$, then there is no record in the target table containing all the required terms in the required fields. Otherwise, the vector $\bar{V}$ contains a 1 only in bits whose serial numbers correspond to the partitions of the target table in which the required combination of terms, as illustrated in Table V, for example, can appear. For example, assuming BLV1, ..., BLV5 to have the following form:

BLV1:

| 1 | 2 | 3 | 4 | 5 | 6 | 7 | 8 | 9 | 10 | 11 | 12 | 13 | 14 | 15 | 16 | 17 | 18 | 19 | ... |
|---|---|---|---|---|---|---|---|---|----|----|----|----|----|----|----|----|----|----|-----|
| 1 | 0 | 0 | 0 | 1 | 0 | 0 | 0 | 1 | 1  | 0  | 0  | 0  | 0  | 0  | 0  | 0  | 0  | 0  | ... |

BLV2:

| 1 | 2 | 3 | 4 | 5 | 6 | 7 | 8 | 9 | 10 | 11 | 12 | 13 | 14 | 15 | 16 | 17 | 18 | 19 | ... |
|---|---|---|---|---|---|---|---|---|----|----|----|----|----|----|----|----|----|----|-----|
| 1 | 0 | 0 | 0 | 1 | 0 | 1 | 1 | 1 | 1  | 1  | 0  | 0  | 0  | 0  | 0  | 0  | 0  | 0  | ... |

BLV3:

| 1 | 2 | 3 | 4 | 5 | 6 | 7 | 8 | 9 | 10 | 11 | 12 | 13 | 14 | 15 | 16 | 17 | 18 | 19 | ... |
|---|---|---|---|---|---|---|---|---|----|----|----|----|----|----|----|----|----|----|-----|
| 1 | 1 | 1 | 1 | 0 | 0 | 0 | 0 | 1 | 0  | 1  | 1  | 1  | 1  | 1  | 1  | 1  | 1  | 0  | ... |

BLV4:

| 1 | 2 | 3 | 4 | 5 | 6 | 7 | 8 | 9 | 10 | 11 | 12 | 13 | 14 | 15 | 16 | 17 | 18 | 19 | ... |
|---|---|---|---|---|---|---|---|---|----|----|----|----|----|----|----|----|----|----|-----|
| 1 | 0 | 0 | 0 | 1 | 1 | 1 | 1 | 1 | 1  | 0  | 0  | 0  | 0  | 0  | 0  | 0  | 0  | 0  | ... |

BLV5:

| 1 | 2 | 3 | 4 | 5 | 6 | 7 | 8 | 9 | 10 | 11 | 12 | 13 | 14 | 15 | 16 | 17 | 18 | 19 | ... |
|---|---|---|---|---|---|---|---|---|----|----|----|----|----|----|----|----|----|----|-----|
| 1 | 0 | 0 | 0 | 1 | 0 | 0 | 0 | 1 | 1  | 0  | 0  | 1  | 1  | 1  | 1  | 0  | 0  | 0  | ... |

The conjunction $\nabla$ of these vectors will be:

| 1 | 2 | 3 | 4 | 5 | 6 | 7 | 8 | 9 | 10 | 11 | 12 | 13 | 14 | 15 | 16 | 17 | 18 | 19 | ... |
|---|---|---|---|---|---|---|---|---|----|----|----|----|----|----|----|----|----|----|-----|
| 1 | 0 | 0 | 0 | 0 | 0 | 0 | 0 | 1 | 0  | 0  | 0  | 0  | 0  | 0  | 0  | 0  | 0  | 0  | ... |

This means that all the terms TermID1-TermID5 together may appear in the designated fields only in partition 1 and/or partition 9 of the target table.

In some cases, it may be determined that an approximate match of the source record is sufficient, such as matching of terms in at least four out of the five fields in question. In this case, the corresponding condition is expressed as follows:

$V = (BLV1)\&(BLV2)\&(BLV3)\&(BLV4)\vee$ $(BLV1)\&(BLV2)\&(BLV3)\&(BLV5)\vee$ $(BLV1)\&(BLV2)\&(BLV4)\&(BLV5)\vee$ $(BLV1)\&(BLV3)\&(BLV4)\&(BLV5)\vee(BLV2)\&$
$(BLV3)\&(BLV4)\&(BLV5)$ In practice, each source term may typically be matched not only with the identical term in fields of the target table, but also with other terms that are closely correlated—and thus may be interchangeable—with the source term. For this purpose, processor 24 may maintain a dictionary containing pairs of TermIDs with their corresponding correlation coefficients. (These coefficients are typically pre-calculated, as described further hereinbelow.) For example, let us assume that the terms in Table V have the following sets of correlated terms, and each of the correlated terms has its own Boolean location vector, as shown below:

$$TermID1 \Rightarrow \{TermIDi_1, TermIDi_2, \ldots, TermIDi_{n1}\}$$
$$\Downarrow \quad \Downarrow \quad \Downarrow$$
$$\{BLVi_1, BLVi_2, \ldots, BLVi_{n1}\}$$

$$TermID2 \Rightarrow \{TermIDj_1, TermIDj_2, \ldots, TermIDj_{n2}\}$$
$$\Downarrow \quad \Downarrow \quad \Downarrow$$
$$\{BLVj_1, BLVj_2, \ldots, BLVj_{n1}\}$$

-continued $$TermID3 \Rightarrow \{TermIDk_1, TermIDk_2, \ldots, TermIDk_{n3}\}$$
$$\Downarrow \quad \Downarrow \quad \Downarrow$$
$$\{BLVk_1, BLVk_2, \ldots, BLVk_{n3}\}$$

$$TermID4 \Rightarrow \{TermIDl_1, TermIDl_2, \ldots, TermIDl_{n4}\}$$
$$\Downarrow \quad \Downarrow \quad \Downarrow$$
$$\{BLVl_1, BLVl_2, \ldots, BLVl_{n4}\}$$

$$TermID5 \Rightarrow \{TermIDr_1, TermIDr_2, \ldots, TermIDr_{n5}\}$$
$$\Downarrow \quad \Downarrow \quad \Downarrow$$
$$\{BLVr_1, BLVr_2, \ldots, BLVr_{n5}\}$$

The Boolean location vector for the aggregate of terms that are correlated with TermID1 is calculated as follows:

$$\overline{BLV1} = BLVi_1 \vee BLVi_2 \vee \ldots \vee BLVi_{n1}$$

Analogously, the Boolean location vectors for the aggregates of terms that are correlated with TermID2, TermID3, TermID4, and TermID5 are expressed as follows:

$$\overline{BLV2} = BLVj_1 \vee BLVj_2 \vee \ldots \vee BLVj_{n2};$$

$$\overline{BLV3} = BLVk_1 \vee BLVk_2 \vee \ldots \vee BLVk_{n3};$$

$$\overline{BLV4} = BLVl_1 \vee BLVl_2 \vee \ldots \vee BLVl_{n4};$$

$$\overline{BLV5} = BLVr_1 \vee BLVr_2 \vee \ldots \vee BLVr_{n5}$$

These disjunctions of Boolean vectors can be calculated in advance for different groups of correlated terms, and in particular for different correlation bounds.

Taking into account both exactly-matching terms and correlated terms, the resulting Boolean vector $\overline{V}$ in place of equation (15) becomes:

$$\overline{V} = (BLV1 \vee \overline{BLV1}) \& (BLV2 \vee \overline{BLV2}) \& (BLV3 \vee \overline{BLV3}) \& (BLV4 \vee \overline{BLV4}) \& (BLV5 \vee \overline{BLV5}) \quad (16)$$

Typically, step 84 is applied to find Boolean location vectors $\overline{V}$ for each of N source records that are to be matched in the target table. An example of the result of this sort of process is shown in the table below:

TABLE VI

BOOLEAN LOCATION VECTORS FOR SOURCE RECORDS

| RecordID | BooleanLocationVector ($\overline{V}$) |
|---|---|
| RecordID1 | 01000011100010111100000000000000 |
| RecordID2 | 11100000000000010000000010100110 |
| RecordID3 | 00000000110000000000000000000000 |
| ... | 00001100101010100000011001010100 |
| ... | 10101000000010110110000000001100 |
| ... | 00000000001110000000000000010000 |
| ... | 11000010000010000100000010000001 |
| ... | 00010100000000100000010000001000 |
| RecordIDN | 01000000000000000000000000110011 |

To find records in the target set that match the source records, processor 24 loads the records in the first partition of the target set into local memory. The processor then searches for matching records only for the source records that have a 1 in the first bit of the BooleanLocationVector $\overline{V}$ in Table VI. After recording the RecordIDs of matching records found in the first partition, the processor goes on to load the second partition of the target set, and searches for matches for the source records that have a 1 in the second bit of $\overline{V}$. The process continues until all the source records have been checked.

A detailed example of this sort of search is presented hereinbelow in Appendix C.

Returning now to FIG. 6, after finding records in the target set that are potential matches for a given source record, processor 24 typically computes a matching score for each such record, at a score computation step 86. As noted earlier, terms may be found to match one another even if they are not identical. (The indexing method described above is particularly useful in identifying terms that have the same meaning but differ due to errors or spelling variances.) Each pair of terms is thus assigned a correlation coefficient $c \leq 1$, wherein $c = 1$ for terms that match exactly. A special method for computing correlation coefficients of multi-word terms was described above with reference to FIG. 5. Other methods that may be used to determine such correlation coefficients are described hereinbelow.

The processor computes the matching score for each pair of potentially-matching records based on the correlation coefficients of the component terms. For example, the matching score C for a pair of records may be computed using the following formula:

$$C = \frac{2 * \left( M + \sum_{i=M+1}^{M1} c_i \right)}{N1 + N2} \quad (17)$$

Here N1 and N2 are the numbers of terms in records 1 and 2, respectively, and M is the number of pairs of terms in the records that are actually identical. $c_i$ is the correlation coefficient for the ith "significant" pair of non-identical terms in the two records (up to a total of M1 pairs), wherein a given pair is considered to be significant if the correlation is no less than some predetermined threshold, $c_i \geq c_{min}$ (for instance, $c_{min} = 0.6$).

Application of formula (17) may be illustrated with reference to the following pair of records:

Record 1: A B C D E

Record 2: A B X Y

We assume that $c(C, X) = 0.9$, and $c(D, Y) = 0.5$ (which is less than $c_{min} = 0.6$). Thus, N1=5, N2=4, M=2, and $$C = \frac{2 * (2 + 0.9)}{5 + 4} = 0.644$$

Typically, the matching score calculation takes into account the term weights that were found at step 52 (FIG. 3). For a given pair of records, the term weights for record 1 are denoted by $w_i^{(1)}$, and the term weights for record 2 by $w_i^{(2)}$:

Record 1: $w_1^{(1)} w_2^{(1)} \ldots w_{N1}^{(1)}$

Record 2: $w_1^{(2)} w_2^{(2)} w_{N2}^{(2)}$

The matching score between the records, taking into account the term weights, may then be expressed as follows:

$$C = \frac{2 * \left( \sum_{i=1}^{M} w_i^{(1)} + \sum_{i=M+1}^{M1} c_i * y_i \right)}{\sum_{i=1}^{N1} w_i^{(1)} + \sum_{i=1}^{N2} w_i^{(2)}} \quad (18)$$

wherein $$y_i = w_{min} + \frac{(w_{av} - w_{min})}{(1 - c_{min})} * (c_i - c_{min}),$$

$w_{min} = \min(w_i^{(1)}, w_i^{(2)})$, $w_{max} = \max(w_i^{(1)}, w_i^{(2)})$, and $$w_{av} = \frac{w_i^{(1)} + w_i^{(2)}}{2}.$$

For example, consider the pair of records:
Record 1: A B C
Record 2: A B D
with the following weights:
Weight for A=0.9;
Weight for B=0.9;
Weight for C=0.9;
Weight for D=0.1;

and correlation coefficient $c_i$=0.8 between terms C and D, with $c_{min}$=0.8. The matching score in this case is $$C = \frac{2 * (1.8 + 0.8 * 0.1)}{4.6} = 0.817.$$

On the other hand, if $c_i$=0.9, then $$C = \frac{2 * (1.8 + 0.9 * 0.3)}{4.6} = 0.9.$$

If the correlation coefficient between terms C and D were $c_i$=1, then the matching score would be C=1.

For each source record, processor 24 sorts the records in the target set that were found to be potential matches according to the respective matching scores, at a record sorting step 88. Records whose matching score is greater than some predetermined threshold are considered to be identical. Alternatively or additionally, other statistical measures may be applied to the matching scores in order to determine a confidence threshold or a set of thresholds. Typically, the processor determines autonomously, without further user involvement, that records with matching scores above the highest confidence threshold are identical. Other records, with high matching scores that are, however, below the highest confidence threshold, may be considered likely matches, and are presented to user 28 for confirmation.

Once processor 24 has found a match between a pair of non-identical records, indicating that the records refer to the same data item, it may use this information to derive additional information regarding term correlations, at a correlation calculation step 89. For example, the processor may identify two tables of records, such that records in one table can be paired with high confidence with corresponding records in the other table. (This sort of record pairing is particularly applicable when both records in each pair share the same value of some unique attribute, such as a unique identification number.) Some of the terms may still be different, however, across each pair of records, because the terms are expressed in different languages or different systems of representation. Processor 24 may thus classify different terms of this sort that appear often in correlated records as similar terms.

In order to identify similar terms in a group of paired records, processor 24 deletes the terms that are identical across each pair of records, and then records all possible pairs of terms in each field. For each of these pairs of terms, the processor calculates the correlation coefficient:

$$\rho(\text{Term1}, \text{Term2}) = \frac{m \cdot N - N_1 \cdot N_2}{\sqrt{N_1 \cdot (N - N_1) \cdot N_2 \cdot (N - N_2)}} \quad (19)$$

wherein m is the number of joint occurrences of Term1 and Term2 among the record pairs; $N_1$ and $N_2$ are the total numbers of occurrences of Term1 and Term2, respectively, in the record pairs; and N is the total number of pairs of terms in all the record pairs.

Then, for each pair of records, processor 24 selects a certain number of the pairs of terms that have the highest correlation coefficients (typically one pair, or possibly two pairs of terms if both pairs are highly correlated). The processor recomputes the correlation coefficient $\rho(\text{Term1}, \text{Term2})$ taking into account only these terms in computing the values of $N_1, N_2, N$ and m. When $\rho(\text{Term1}, \text{Term2})=1$ (i.e., $m=N_1=N_2$), $\rho$ may be recalculated as follows in order to decrease the correlation value of infrequent term pairs:

$$\rho(\text{Term1}, \text{Term2}) = \min(0.975 + 0.0025 * m, 1)$$

Processor 24 sorts the pairs of terms in decreasing order of their correlation coefficients $\rho(\text{Term1}, \text{Term2})$, and then records the pairs of terms whose correlation coefficient $\rho(\text{Term1}, \text{Term2})$ is not less than a predetermined threshold value $\rho_{min}$, such as $\rho_{min}=0.5$. The correlations between these non-identical terms may be used in determining accurate values of the correlation coefficient c for these term pairs for use in computing matching scores between records at subsequent passes through step 86.

Automatic Classification of Records

Figure 7:
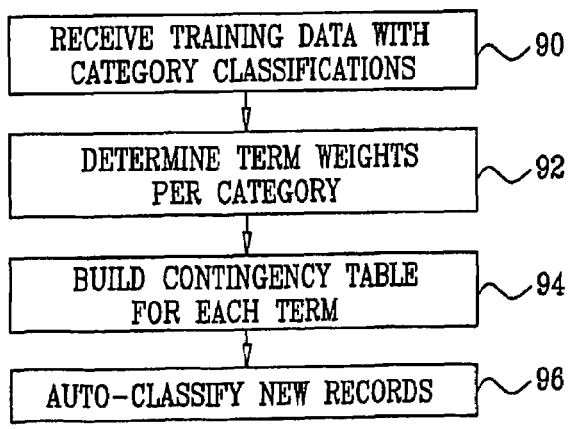
FIG. 7 is a flow chart that schematically illustrates a method for classifying data records, in accordance with an embodiment of the present invention.

FIG. 7 is a flow chart that schematically illustrates a method for automatic classification of records into categories, in accordance with an embodiment of the present invention. To initiate this method, user 28 provides processor with a set of training data, at a training step 90. Typically, the training data comprises database records that have been marked with category classifications. For example, the user may review a certain set of records in one of repositories 22 and input the corresponding category classifications or, at least, verify that the classifications associated with the records are correct.

The processor uses this training set as the basis for automatic extraction of classification rules, which may then be used in automatic classification of other records. In deriving the rules, the processor must often deal with situations in which there are relatively few examples of each given category, and in which there may be multiple words in each field (including multi-word terms), some of which may not exactly match the corresponding terms that are used in the training set.

Figure 8:
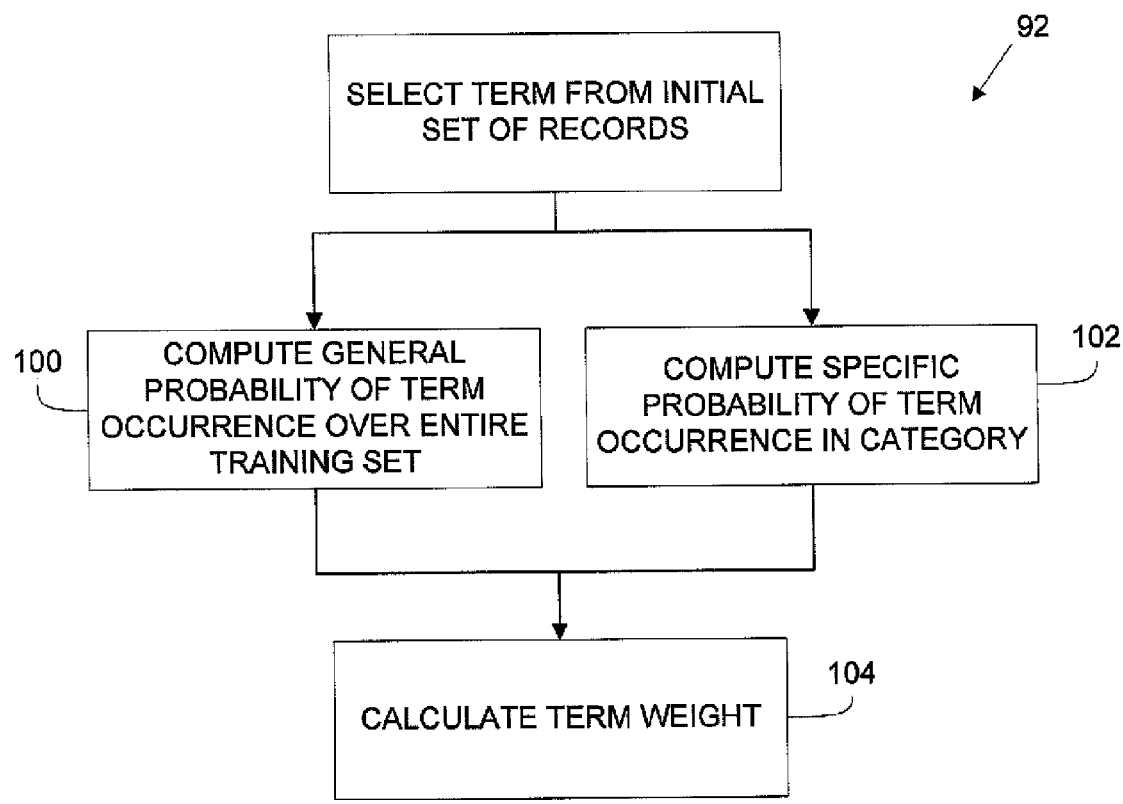
FIG. 8 is a flow chart that schematically illustrates a method for calculating term weights, in accordance with an embodiment of the invention.

In order to determine the classification rules under these constraints, processor 24 uses the training data to compute term weights for the terms that appear in each field of the data records for each category, at a weight determination step 92, and as shown in more detail in FIG. 8. Assuming that there are n total terms in a given field in the records in a particular category, including m distinct terms, the processor computes the relative frequency of each term $P_i$ (i.e., the probability of appearance of the term) in the field of question for i=, ..., m over the entire training set (or the entire database) in step 100. The processor also computes the frequency $k_i$ of the term in the field within the particular category in step 102. By definition, $$\sum_{i=1}^{m} k_i = n.$$

The weight assigned to each term is defined by the level of "unexpectedness" of its appearance in the category, which can be expressed in terms of the probability that the term is not contained in the category: $p_i(n, 0)$ $(1-P_i)^n$. Conversely, the probability that term i will appear k times among n terms of the category is given by the binomial distribution law:

$$p_i(n,k) = C_n^k \cdot (P_i)^k \cdot (1-P_i)^{n-k} \quad (20)$$

wherein $$C_n^k = \frac{n!}{k!(n-k)!}.$$

These probabilities may be calculated by the recursion relation:

$$p_i(n, k) = p_i(n, k-1) \cdot \frac{(n-k+1) \cdot P_i}{k \cdot (1-P_i)} \quad (21)$$

Since $$\sum_{k=0}^{n} p_i(n, k) = 1,$$

the probability that the category in question contains term i at least once will be:

$$\tilde{p}_i(n,1) = 1 - p_i(n,0) = 1 - (1-P_i)^n \quad (22)$$

For $P_i$=0.001, for example, $\tilde{p}_i(n, 1)$ is less than 10% for n=100, and only around 25% for n=300. Thus, the appearance of term i in this category may be sufficiently unexpected to receive a significant weight.

Generalizing equation (22), the probability that term i appears in a given category at least k times will be:

$$\tilde{p}_i(n, k) = 1 - \sum_{j=0}^{k-1} p_i(n, j) \quad (23)$$

The less the probability $\tilde{p}_i(n, k)$, the greater should be the significance of appearances of the term i in the category.

To determine which term appearances are significant, processor 24 compares $\tilde{p}_i(n, k)$ to a maximum value $\tilde{p}_{max}$: If $\tilde{p}_i(n, k)$ is no greater than $\tilde{p}_{max}$, then the appearance of the term i in the category is significant. For example, if $\tilde{p}_{max}$=0.2, then for a term i for which $P_i$=0.001, with n=300, the processor will consider a single appearance of this term in the category ($k_i$=1) to be insignificant, since $\tilde{p}_i(n, k_i) = \tilde{p}_i(300, 1)$ 0.259 > $\tilde{p}_{max}$=0.2.

Based on the value of $\tilde{p}_{max}$, processor 24 may calculate the minimum number $k_{min}^{(i)}$ of appearances of the term i in the category in question that are necessary to consider the term significant. From equation (21), the summary probability that term i appears less than k times among n terms of the category is:

$$p_i^\Sigma(n, k) = p_i(n, 0) + \ldots + p_i(n, k-1) = \sum_{j=0}^{k-1} p_i(n, j) \quad (24)$$

If $P_i^\Sigma(n, k_i) > 1 - \tilde{p}_{max}$ (in the present example, $P_i^\Sigma(n, k_i) > 0.8$), then term i is significant in the considered category. $k_{min}^{(i)}$ is defined as the minimal value of k for which the inequality $P_i^\Sigma(n, k) > 0.8$ is fulfilled. Sample values of summary probabilities for different values of n, k and $P_i$ are presented below in Appendix D.

Processor 24 uses the considerations presented above in determining the term weights $w_i$, i=1, ..., m, at step 104. It is convenient to assign the weights within the interval [0, 1]. The maximal weight ($w_i$=1) is assigned to the most significant term, while the minimal weight ($w_i$=0) is assigned to terms that were found to be statistically insignificant. In other words, zero weight is assigned to each term i for which $P_i^\Sigma(n, k_i) \leq 1 - \tilde{p}_{max}$ (i.e., $P_i^\Sigma(n, k_i) \leq 0.8$ in the present example). On the other hand, if $P_i^\Sigma(n, k_i) > 0.8$, then term i is considered to be significant.

For each significant term i, the weight may be assigned, for example, according to the formula:

$$W_i = 5 \cdot P_i^\Sigma(n, k_i) - 4 \quad (25)$$

This formula linearly transforms the interval of values of probability (0.8, 1] into the range of weights (0, 1]. The calculated weights are indicative of the probability that a record in which a particular term occurs belongs to the category in question. In parametric form, equation (25) may be written as follows:

$$W_i = \frac{P_i^\Sigma(n, k_i) - \tilde{p}_{min}}{1 - \tilde{p}_{min}} \quad (26)$$

wherein $\tilde{p}_{min} = 1 - \tilde{p}_{max}$.

To compare weights of the terms that may appear in a particular field in records belonging to different categories, processor 24 constructs a term contingency table, at a table building step 94. The table contains weights $w_{ij}$ of terms j within multiple, different categories i, for i=1, ..., n, j=1, ..., m:

TABLE VII

GENERIC TERM CONTINGENCY TABLE

| Categories | $T_1$ | $T_2$ | ... | $T_j$ | ... | $T_m$ | Σ |
|---|---|---|---|---|---|---|---|
| Cat1 | $w_{11}$ | $w_{12}$ | | $w_{1j}$ | | $w_{1m}$ | $W_1^{Cat}$ |
| Cat2 | $w_{21}$ | $w_{22}$ | | $w_{2j}$ | | $w_{2m}$ | $W_2^{Cat}$ |
| ... | | | | | | | |
| Cati | $w_{i1}$ | $w_{i2}$ | | $w_{ij}$ | | $w_{im}$ | $W_i^{Cat}$ |
| ... | | | | | | | |
| Catn | $w_{n1}$ | $w_{n2}$ | | $w_{nj}$ | | $w_{nm}$ | $W_n^{Cat}$ |
| Σ | $W_1^{Term}$ | $W_2^{Term}$ | | $W_j^{Term}$ | | $W_m^{Term}$ | W |

The table contains only categories having at least one term with a nonzero weight, and only terms having nonzero weight in at least one category. The last column in the table contains the total sum of the weights for each category, $$W_i^{Cat} = \sum_{j=1}^{m} w_{ij},$$

while the last row contains the total sum of weights for each term over all categories, $$W_j^{Term} = \sum_{i=1}^{n} w_{ij}.$$

The total sum of the weights is $$W = \sum_{i=1}^{n} W_i^{Cat} = \sum_{j=1}^{m} W_j^{Term}.$$

Processor 24 uses the term contingency tables in order to classify new records (not in the training set), at an auto-classification step 96. In this process, it is assumed that the record to be classified contains k terms $T_{j_1}, \ldots, T_{j_k}$ in the field to which the above contingency table corresponds. (In the simplest case, k may be equal to 1.) Let $\{i_1, \ldots, i_s\}$ be the set of categories such that for any $i \in \{i_1, \ldots, i_s\}$, there exists at least one of terms $T_{j_1}, \ldots, T_{j_k}$ having $w_{ij_l} \neq 0, l \in \{1, \ldots, k\}$. The processor uses the weights in the contingency table to calculate a respective probability that the record belongs to each of the categories in $\{i_1, \ldots, i_s\}$.

For example, the term contingency table below refers to ten categories and ten terms, wherein the record to be classified contains the terms $T_3, T_6, T_7$ in a certain field:

TABLE VIII

SAMPLE TERM CONTINGENCY TABLE

| Categories | 1 | 2 | 3 ↓ | 4 | 5 | 6 ↓ | 7 ↓ | 8 | 9 | 10 | Σ |
|---|---|---|---|---|---|---|---|---|---|---|---|
| 1 | 0 | 0 | 0 | 0 | 0 | 0 | 0 | 0 | 0.99 | 0 | 0.99 |
| 2 → | 0 | 0 | 0.9 | 0 | 0 | 0.8 | 0.99 | 0 | 0 | 0.3 | 2.99 |
| 3 | 0 | 0.99 | 0 | 0 | 0 | 0 | 0 | 0 | 0 | 0 | 0.99 |
| 4 | 0.2 | 0 | 0 | 0 | 0 | 0 | 0 | 0 | 0 | 0 | 0.2 |
| 5 → | 0 | 0 | 0.4 | 0 | 0 | 0 | 0 | 0.9 | 0 | 0 | 1.3 |
| 6 | 0 | 0 | 0 | 0.8 | 0.7 | 0 | 0 | 0 | 0 | 0 | 1.5 |
| 7 | 0 | 0 | 0 | 0 | 0 | 0 | 0 | 0 | 0 | 0.2 | 0.2 |
| 8 | 0 | 0 | 0 | 0 | 0 | 0 | 0 | 0 | 0.5 | 0 | 0.5 |
| 9 | 0 | 0 | 0 | 0 | 0 | 0 | 0 | 0 | 0 | 0.7 | 0.7 |
| 10 | 0 | 0 | 0 | 0.7 | 0.3 | 0 | 0 | 0 | 0 | 0 | 1.0 |
| Σ | 0.2 | 0.99 | 1.3 | 1.5 | 1.0 | 0.8 | 0.99 | 0.9 | 1.49 | 1.2 | 10.37 |

In this case, the terms of interest ($T_3, T_6, T_7$—indicated by down-arrows in the top row of the table) occur in only categories 2 and 5 (so s=2).

Processor 24 calculates the respective measure of correspondence of the given record to each possible category $i_a \in \{i_1, \ldots, i_s\}$ as follows: Let $J_{i_a}$ be the subset of terms belonging to the set $\{T_{j_1}, \ldots, T_{j_k}\}$ having nonzero weight in the row $i_a$ of the contingency table, i.e., $J_{i_a} = \{j_l \in \{j_1, \ldots, j_k\} | w_{i_a,j_l} \neq 0\}$. (In the above example, $J_2 = \{3, 6, 7\}$, and $J_5 = \{3\}$.) For a given category i belonging to the set $\{i_1, \ldots, i_s\}$, the sum of weights relevant to this category for the given record is:

$$\tilde{W}_i = \sum_{j \in J_i} w_{ij} \tag{27}$$

The probability that the record belongs to the category i is then determined by the value:

$$p_i = \frac{\tilde{W}_i}{\sum_{j \in J_i} W_j^{Term}} \tag{28}$$

Generally speaking, processor 24 assigns the record to the category with the greatest cumulative probability over all fields, as determined by equation (28). The processor may also assess the reliability of the assignment to category i based on the terms in the field in question by using the relation $$\frac{\tilde{W}_i}{W_i^{Cat}}$$

as a measure of confidence. Additionally or alternatively, the measure of confidence of assignment of the record to category i may be represented by the reliability index:

$$R_i = \frac{\tilde{W}_i * W - \left(\sum_{j \in J_i} W_j^{Term}\right) * W_i^{Cat}}{\sqrt{\left(\sum_{j \in J_i} W_j^{Term}\right) * \left(W - \sum_{j \in J_i} W_j^{Term}\right) * W_i^{Cat} * (W - W_i^{Cat})}} \quad (29)$$

The higher the value of $R_i$, the greater is the level of confidence that assignment of the record to category i is correct. To choose the likeliest category, the processor may use the expectation value of the sum of weights as an assignment metric for category i:

$$V_i = \tilde{W}_i * R_i \quad (30)$$

Referring back to the example in Table VIII, for category i=2, the sum of weights is $\tilde{W}_2 = 0.9 + 0.8 + 0.99 = 2.69$, and the reliability is $R_2 = 0.837$. For category i=5, the sum of weights is $\tilde{W}_5 = 0.4$, and the reliability is $R_5 = 0.2$. Clearly, the processor will choose category 2.

The calculation of $\tilde{W}_i$ that is presented in equation (27) assumes exact matching of terms $T_{j_1}, \ldots, T_{j_k}$ in the record to be classified to the corresponding terms in the contingency table (Table VII). More generally, processor 24 takes into account approximate matching of the terms, as well, using the correlation coefficients between associated terms, as described above. Assuming $c_{j_1}$ is the correlation coefficient for matching of a term $T_{j_1}$ in the record to a corresponding term in the contingency table, then equation (27) is transformed into the following form:

$$\tilde{W}_i = \sum_{j \in J_i} w_{ij} * c_j \quad (31)$$

The assignment metric given by equation (30) refers only to one of the fields f of the record, i.e., $V_i = V_i(f)$. In general, processor 24 classifies records based on an overall assignment metric for each category i, which is a weighted sum of the assignment metrics for the individual fields:

$$A_i = \sum_f W_f^{Field} * V_i(f) \quad (32)$$

Here $W_f^{Field}$ is the weight for each field f, which may be assigned heuristically based on the contents of the different fields and their relative significance in categorization of the records. Processor 24 sorts the assignment metrics $A_i$ in decreasing order, and typically chooses the category corresponding to the first value in the sorted sequence as the classification of the record under consideration.

Alternatively, processor 24 may determine an assignment metric $Cr_i$ for category i by first computing the probability $P_i$ that the record under consideration belongs to this category on the basis of the terms in a given field f:

$$P_i^{(f)} = \frac{\sum_j p_{ij} * R_{ij}}{\sum_j R_{ij}} \quad (33)$$

In this formula, for each term j, the probability $p_{ij}$ and the corresponding reliability $R_{ij}$ are calculated according to equations (28) and (29), respectively, over the set $J_i$ consisting of the single element j, i.e. $J_i = \{j\}$. The processor then calculates the mathematical expectation of probability that the record belongs to category i by summing equation (33) over all fields:

$$P_i = \frac{\sum_f P_i^{(f)} * R_i^{(f)}}{\sum_f R_i^{(f)}} \quad (34)$$

wherein the reliability $R_i^{(f)}$ may be computing using equation (29). The corresponding reliability $\tilde{R}_i$ over all field is given by:

$$\tilde{R}_i = \frac{\sum_f P_i^{(f)} * R_i^{(f)}}{\sum_f P_i^{(f)}} \quad (35)$$

The assignment metric for category i is then $Cr_i = P_i * \tilde{R}_i$.

Additionally or alternatively, processor 24 may take into account the a priori probability $p_a^{(i)}$ for assignment of a record to each category i:

$$p_a^{(i)} = \frac{W_i^{Cat}}{W} \quad (36)$$

Only those terms that satisfy the condition that $p_i \geq (1+s) * p_a^{(i)}$ are taken into account in computing the assignment metrics, wherein $p_i$ is the probability that the record belongs to the category i, given a certain term j. $p_i$ may be calculated using equation (28) with $$J_i = \{j\}, \text{ i.e., } \tilde{W}_i = \sum_{j \in J_i} w_{ij} = w_{ij}, \sum_{j \in J_i} W_j^{Term} = W_j^{Term},$$

and hence, $$p_i = \frac{w_{ij}}{W_j^{Term}}.$$

The parameter s can be set heuristically, for example, s=0.4.

Although the embodiments presented above relate to classification of records in a database, the principles underlying these embodiments may also be applied to classification of data in other data structures, as well as free text. In the latter case, processor 24 extracts terms from the text and considers the terms according to their respective weights, based on the associations between the terms and predefined categories. Unusual terms will generally receive large weights, whereas common terms will be excluded from consideration.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

Hash Functions

The following hash functions may be used in encoding character strings at step 64 (FIG. 4).

For $n \leq 4$, the following hash function $h_1(x_1 x_2 x_3 x_4)$ is created:

$$h_1(x_1 x_2 x_3 x_4) = y_1 + 27 \ast y_2 + 27^2 \ast y_3 + 27^3 \ast y_4$$

or $$h_1(x_1 x_2 x_3 x_4) = y_1 + 27 \ast y_2 + 729 \ast y_3 + 19683 \ast y_4$$

wherein either $y_i = C[x_i]$, or $y_i$ is determined according to equation (2). The maximum possible value of this function is $27^4 - 1$, or 531,440.

For $n=5$, the following hash function $h_2(x_1 x_2 x_3 x_4 x_5)$ is created:

$$h_2(x_1 x_2 x_3 x_4 x_5) = y_1 + 27 \ast y_2 + 27^2 \ast y_3 + 27^3 \ast y_4 + 27^4 \ast y_5 \pmod{P_2}$$

or $$h_2(x_1 x_2 x_3 x_4 x_5) = y_1 + 27 \ast y_2 + 729 \ast y_3 + 19683 \ast y_4 + 531441 \ast y_5 \pmod{P_2}$$

Here $P_2$ is a prime number chosen to achieve uniqueness of the hash function, while guaranteeing an admissible size of the corresponding hash table. $P_2$ may be chosen depending on the frequency of words of the length in question (in this case, five characters). Alternatively, the processor may simply search for the required value of the prime number $P_2$ starting with $5 \ast F_5$, wherein $F_5$ is the frequency of words of length of 5 in the database. By default, the processor may set $P_2 = 500009$. In this case, the maximum value of the hash function $h_2(x_1 x_2 x_3 x_4 x_5)$ is 500,008.

For $n=6$, the following hash function $h_3(x_1 x_2 x_3 x_4 x_5 x_6)$ is created:

$$h_3(x_1 x_2 x_3 x_4 x_5 x_6) = y_1 + 27 \ast y_2 + 27^2 \ast y_3 + 27^3 \ast y_4 + 27^4 \ast y_5 + 27^5 \ast y_6 \pmod{P_3}$$

or $$h_3(x_1 x_2 x_3 x_4 x_5 x_6) = y_1 + 27 \ast y_2 + 729 \ast y_3 + 19683 \ast y_4 + 531441 \ast y_5 + 14348907 \ast y_6 \pmod{P_3}$$

Here $P_3$ is the prime number, wherein by default, $P_3 = 501001$. The maximum value of the hash function $h_3(x_1 x_2 x_3 x_4 x_5 x_6)$ is 501,000.

For $n=7$, the following hash function $h_4(x_1 x_2 x_3 x_4 x_5 x_6 x_7)$ is created:

$$h_4(x_1 x_2 x_3 x_4 x_5 x_6 x_7) = y_1 + 23 \ast y_2 + 389 \ast y_3 + 12541 \ast y_4 + 260017 \ast y_5 + 5000087 \ast y_6 + 100000007 \ast y_7 \pmod{P_4}$$

Here $P_4$ is the prime number, wherein by default, $P_4 = 502013$. The maximum value of the hash function $h_4(x_1 x_2 x_3 x_4 x_5 x_6 x_7)$ is 502,012.

For $n=8$, the following hash function $h_5(x_1 x_2 x_3 x_4 x_5 x_6 x_7 x_8)$ is created:

$$h_5(x_1 x_2 x_3 x_4 x_5 x_6 x_7 x_8) = y_1 + 19 \ast y_2 + 239 \ast y_3 + 4523 \ast y_4 + 58997 \ast y_5 + 1004027 \ast y_6 + 12000097 \ast y_7 + 122950013 \ast y_8 \pmod{P_5}$$

Here $P_5$ is the prime number, wherein by default, $P_5 = 502429$. The maximum value of the hash function $h_5(x_1 x_2 x_3 x_4 x_5 x_6 x_7 x_8)$ is 502,428.

For $n=9$, the following hash function $h_6(x_1 x_2 x_3 x_4 x_5 x_6 x_7 x_8 x_9)$ is created:

$$h_6(x_1 x_2 x_3 x_4 x_5 x_6 x_7 x_8 x_9) = y_1 + 13 \ast y_2 + 167 \ast y_3 + 2111 \ast y_4 + 28001 \ast y_5 + 300007 \ast y_6 + 2150011 \ast y_7 + 13850621 \ast y_8 + 131000021 \ast y_9 \pmod{P_6}$$

Here $P_6$ is the prime number, wherein by default, $P_6 = 503213$. The maximum value of the hash function $h_6(x_1 x_2 x_3 x_4 x_5 x_6 x_7 x_8 x_9)$ is 503,212.

For $n=10$, the following hash function $h_7(x_1 x_2 x_3 x_4 x_5 x_6 x_7 x_8 x_9 x_{10})$ is created:

$$h_7(x_1 x_2 x_3 x_4 x_5 x_6 x_7 x_8 x_9 x_{10}) = y_1 + 11 \ast y_2 + 113 \ast y_3 + 1327 \ast y_4 + 13217 \ast y_5 + 10003 \ast y_6 + 990163 \ast y_7 + 5000161 \ast y_8 + 24700129 \ast y_9 + 124004977 \ast y_{10} \pmod{P_7}$$

Here $P_7$ is the prime number, wherein by default, $P_7 = 503929$. The maximum value of the hash function $h_7(x_1 x_2 x_3 x_4 x_5 x_6 x_7 x_8 x_9 x_{10})$ is 503,928.

For $n \geq 10$, the following hash function $h_8(x_1 \ldots x_n)$ is created:

$$h_8(x_1 \ldots x_n) = \left( y_1 + 11 \ast y_2 + 109 \ast y_3 + 1013 \ast y_4 + 6131 \ast y_5 + 55001 \ast y_6 + 306133 \ast y_7 + 1155169 \ast \left[ \left( \sum_{i=8}^{n} (i-7) \ast y_i \right) \bmod 3433 \right] \right) \bmod P_8$$

Here $P_8$ is the prime number, wherein by default, $P_8 = 503947$. The maximum value of the hash function $h_8(x_1 \ldots x_n)$ is 503,946.

APPENDIX B

Processing Conjoined Terms

Given the string $x_1x_2x_3x_4x_5x_6x_7x_8x_9x_{10}$, the value of the hash function $v=S_7+h_7(x_1 \ldots x_{10})$ is calculated as given by equation (3). Assuming that $HT[v]=0$, the string $x_1x_2x_3x_4x_5x_6x_7x_8x_9x_{10}$ is sequentially partitioned into two substrings, as follows:

1) $x_1$ and $x_2x_3x_4x_5x_6x_7x_8x_9x_{10}$.
$v_1=h_1(x_1)$;
$v_2=S_6+h_6(x_2x_3x_4x_5x_6x_7x_8x_9x_{10})$.
If $HT[v_1]\neq 0$ and $HT[v_2]\neq 0$, then the string $x_1x_2x_3x_4x_5x_6x_7x_8x_9x_{10}$ consists of the two conjoined terms $x_1$ and $x_2x_3x_4x_5x_6x_7x_8x_9x_{10}$.
Else:

2) $x_1x_2$ and $x_3x_4x_5x_6x_7x_8x_9x_{10}$.
$v_1=h_1(x_1x_2)$;
$v_2=S_5+h_5(x_3x_4x_5x_6x_7x_8x_9x_{10})$.
If $HT[v_1]\neq 0$ and $HT[v_2]\neq 0$, then the string $x_1x_2x_3x_4x_5x_6x_7x_8x_9x_{10}$ consists of the two conjoined terms $x_1x_2$ and $x_3x_4x_5x_6x_7x_8x_9x_{10}$.
Else:

3) $x_1x_2x_3$ and $x_4x_5x_6x_7x_8x_9x_{10}$.
$v_1=h_1(x_1x_2x_3)$;
$v_2=S_4+h_4(x_4x_5x_6x_7x_8x_9x_{10})$.
If $HT[v_1]\neq 0$ and $HT[v_2]\neq 0$ then the string $x_1x_2x_3x_4x_5x_6x_7x_8x_9x_{10}$ consists of the two conjoined terms $x_1x_2x_3$ and $x_4x_5x_6x_7x_8x_9x_{10}$.
Else:

4) $x_1x_2x_3x_4$ and $x_5x_6x_7x_8x_9x_{10}$.
$v_1=h_1(x_1x_2x_3x_4)$;
$v_2=S_3+h_3(x_5x_6x_7x_8x_9x_{10})$.
If $HT[v_1]\neq 0$ and $HT[v_2]\neq 0$, then the string $x_1x_2x_3x_4x_5x_6x_7x_8x_9x_{10}$ consists of the two conjoined terms $x_1x_2x_3x_4$ and $x_5x_6x_7x_8x_9x_{10}$.
Else:

5) $x_1x_2x_3x_4x_5$ and $x_6x_7x_8x_9x_{10}$.
$v_1=S_2+h_2(x_1x_2x_3x_4x_5)$;
$v_2=S_2+h_2(x_6x_7x_8x_9x_{10})$.
If $HT[v_1]\neq 0$ and $HT[v_2]\neq 0$, then the string $x_1x_2x_3x_4x_5x_6x_7x_8x_9x_{10}$ consists of the two conjoined terms $x_1x_2x_3x_4x_5$ and $x_6x_7x_8x_9x_{10}$.
Else:

6) $x_1x_2x_3x_4x_5x_6$ and $x_7x_8x_9x_{10}$.
$v_1=S_3+h_3(x_1x_2x_3x_4x_5x_6)$;
$v_2=h_1(x_7x_8x_9x_{10})$.
If $HT[v_1]\neq 0$ and $HT[v_2]\neq 0$, then the string $x_1x_2x_3x_4x_5x_6x_7x_8x_9x_{10}$ consists of the two conjoined terms $x_1x_2x_3x_4x_5x_6$ and $x_7x_8x_9x_{10}$.
Else:

7) $x_1x_2x_3x_4x_5x_6x_7$ and $x_8x_9x_{10}$.
$v_1=S_4+h_4(x_1x_2x_3x_4x_5x_6x_7)$;
$v_2=h_1(x_8x_9x_{10})$.
If $HT[v_1]\neq 0$ and $HT[v_2]\neq 0$ then the string $x_1x_2x_3x_4x_5x_6x_7x_8x_9x_{10}$ consists of the two conjoined terms $x_1x_2x_3x_4x_5x_6x_7$ and $x_8x_9x_{10}$.
Else:

8) $x_1x_2x_3x_4x_5x_6x_7x_8$ and $x_9x_{10}$.
$v_1=S_5+h_5(x_1x_2x_3x_4x_5x_6x_7x_8)$;
$v_2=h_1(x_9x_{10})$.
If $HT[v_1]\neq 0$ and $HT[v_2]\neq 0$, then the string $x_1x_2x_3x_4x_5x_6x_7x_8x_9x_{10}$ consists of the two conjoined terms $x_1x_2x_3x_4x_5x_6x_7x_8$ and $x_9x_{10}$.
Else:

9) $x_1x_2x_3x_4x_5x_6x_7x_8x_9$ and $x_{10}$.
$v_1=S_6+h_6(x_1x_2x_3x_4x_5x_6x_7x_8x_9)$;
$v_2=h_1(x_{10})$.
If $HT[v_1]\neq 0$ and $HT[v_2]\neq 0$, then the string $x_1x_2x_3x_4x_5x_6x_7x_8x_9x_{10}$ consists of the two conjoined terms $x_1x_2x_3x_4x_5x_6x_7x_8x_9$ and $x_{10}$.

EXAMPLE

Let us examine the following input string: NOAMLEVI, and assume that in the previous stage, the processor determined that 'NOAM' represents group #2317, and 'LEVI' represents group #12. In other words, for NOAM, $v_1=(78-64)+27*(79-64)+729*(65-64)+19683*(77-64)=257027$, and $HT[v_1]=2317$. For LEVI, $v_2=(76-64)+27*(69-64)+729*(86-64)+19683*(73-64)=193332$, and $HT[v_2]=12$. At the fourth step of the method presented above, the correspondence between the input string and the sub-strings will be revealed. (The above method assumes that each of the component terms in the input string exists separately without spelling errors, after completing the creation of all TermIDs, as described above.

APPENDIX C

Search Using Boolean Location Vectors

In the following example, it is assumed that the terms in three fields of a source record are to be compared with the terms in the same three fields of a set of target records:
FieldID1⇒FieldID1;
FieldID2⇒FieldID2;
FieldID3⇒FieldID3.

The target table below contains the TermIDs of the terms that appear in fields 1-3 of each of the records:

TABLE C-1

| | TARGET TABLE | | |
|---|---|---|---|
| RecordID | FieldID1 | FieldID2 | FieldID3 |
| 1 (1) | 12 | 105 | 205 |
| 2 (1) | 27 | 105 | 207 |
| 3 (1) | 1 | 109 | 201 |
| 4 (1) | 12 | 108 | 200 |
| 5 (2) | 30 | 105 | 221 |
| 6 (2) | 1 | 109 | 221 |
| 7 (2) | 30 | 109 | 203 |
| 8 (2) | 1 | 105 | 203 |
| 9 (3) | 27 | 108 | 221 |
| 10 (3) | 27 | 108 | 221 |
| 11 (3) | 27 | 108 | 202 |
| 12 (3) | 6 | 107 | 221 |
| 13 (4) | 12 | 106 | 221 |
| 14 (4) | 6 | 107 | 201 |
| 15 (4) | 7 | 106 | 221 |
| 16 (4) | 6 | 107 | 221 |
| 17 (5) | 27 | 106 | 200 |
| 18 (5) | 12 | 107 | 203 |
| 19 (5) | 7 | 109 | 200 |
| 20 (5) | 25 | 106 | 200 |

The numbers in parentheses in the table above reflect the partitioning of the table into the following five partitions:

TABLE C-2

PARTITIONING OF RECORDS

| Serial number of part | Records |
|---|---|
| 1 | 1-4 |
| 2 | 5-8 |
| 3 | 9-12 |
| 4 | 13-16 |
| 5 | 17-20 |

The following tables show the BooleanLocationVector value for each term in each of the above fields:

TABLE C-3

BOOLEAN LOCATION VECTORS FOR FIELDID1

| TermID | Frequency | BooleanLocationVector |
|---|---|---|
| 27 | 5 | 10101 |
| 12 | 4 | 10011 |
| 1 | 3 | 11000 |
| 6 | 3 | 00110 |
| 7 | 2 | 00011 |
| 30 | 2 | 01000 |
| 25 | 1 | 00001 |

TABLE C-4

BOOLEAN LOCATION VECTORS FOR FIELDID2

| TermID | Frequency | BooleanLocationVector |
|---|---|---|
| 105 | 4 | 11000 |
| 106 | 4 | 00011 |
| 107 | 4 | 00111 |
| 108 | 4 | 10100 |
| 109 | 4 | 11001 |

TABLE C-5

BOOLEAN LOCATION VECTORS FOR FIELDID3

| TermID | Frequency | BooleanLocationVector |
|---|---|---|
| 221 | 8 | 01110 |
| 200 | 4 | 10001 |
| 203 | 3 | 01001 |
| 201 | 2 | 10010 |
| 207 | 1 | 10000 |
| 202 | 1 | 00100 |
| 205 | 1 | 10000 |

The source table below contains fifteen records that are to be matched to the corresponding records in target table C-1:

TABLE C-6

SOURCE TABLE

| RecordID | FieldID1 | FieldID2 | FieldID3 |
|---|---|---|---|
| 1 | 6 | 107 | 221 |
| 2 | 27 | 105 | 200 |
| 3 | 1 | 107 | 203 |
| 4 | 1 | 105 | 221 |
| 5 | 25 | 109 | 205 |
| 6 | 30 | 109 | 203 |
| 7 | 7 | 106 | 221 |
| 8 | 27 | 108 | 201 |
| 9 | 12 | 107 | 203 |
| 10 | 12 | 105 | 207 |
| 11 | 6 | 105 | 207 |
| 12 | 30 | 109 | 202 |
| 13 | 25 | 107 | 221 |
| 14 | 1 | 105 | 221 |
| 15 | 27 | 108 | 200 |

The Boolean location vectors for the records of the source table are tabulated below, based on conjunction of the vectors for the component terms that were determined in Tables C-3, C-4 and C-5 above:

TABLE C-7

BOOLEAN LOCATION VECTORS FOR SOURCE TERMS

| RecordID | FieldID1 | FieldID2 | FieldID3 | Resulting BLV |
|---|---|---|---|---|
| 1 | 6 ⇒00110 | 107 ⇒00111 | 221 ⇒01110 | 00110 |
| 2 | 27 ⇒10101 | 105 ⇒11000 | 200 ⇒10001 | 10000 |
| 3 | 1 ⇒11000 | 107 ⇒00111 | 203 ⇒01001 | 00000 |
| 4 | 1 ⇒11000 | 105 ⇒11000 | 221 ⇒01110 | 01000 |
| 5 | 25 ⇒00001 | 109 ⇒11001 | 205 ⇒10000 | 00000 |
| 6 | 30 ⇒01000 | 109 ⇒11001 | 203 ⇒01001 | 01000 |
| 7 | 7 ⇒00011 | 106 ⇒00011 | 221 ⇒01110 | 00010 |
| 8 | 27 ⇒10101 | 108 ⇒10100 | 201 ⇒10010 | 10000 |
| 9 | 12 ⇒10011 | 107 ⇒00111 | 203 ⇒01001 | 00001 |
| 10 | 12 ⇒10011 | 105 ⇒11000 | 207 ⇒10000 | 10000 |
| 11 | 6 ⇒00110 | 105 ⇒11000 | 207 ⇒10000 | 00000 |
| 12 | 30 ⇒01000 | 109 ⇒11001 | 202 ⇒00100 | 00000 |
| 13 | 25 ⇒00001 | 107 ⇒00111 | 221 ⇒01110 | 00000 |
| 14 | 1 ⇒11000 | 105 ⇒11000 | 221 ⇒01110 | 01000 |
| 15 | 27 ⇒10101 | 108 ⇒10100 | 200 ⇒10001 | 10000 |

Examination of Table C-7 shows, for example, that there are no matching records in the target table for the source records with RecordID=3 and RecordID=5. Therefore, no further search is required for these records. Records that match the source record with RecordID=1 may be located only within the third and fourth partitions of the target table (BLV=00110). Matching records for the source record with RecordID=2 may be located only within the first partition (BLV=10000), and so forth. Thus, to find the actual matching records for each record of the source array, it is sufficient to scan only the partition(s) of the target table that are indicated by the BLV in the last column of Table C-7. The results are presented in the table below:

TABLE C-8

MATCHING RESULTS

| RecordID | FieldID1 | FieldID2 | FieldID3 | Partition of target table | Matching target RecordID(s) |
|---|---|---|---|---|---|
| 1 | 6 | 107 | 221 | 3, 4 | 12, 16 |
| 2 | 27 | 105 | 200 | 1 | — |
| 3 | 1 | 107 | 203 | — | — |
| 4 | 1 | 105 | 221 | 2 | — |
| 5 | 25 | 109 | 205 | — | — |
| 6 | 30 | 109 | 203 | 2 | 7 |
| 7 | 7 | 106 | 221 | 4 | 15 |
| 8 | 27 | 108 | 201 | 1 | — |
| 9 | 12 | 107 | 203 | 5 | 18 |
| 10 | 12 | 105 | 207 | 1 | — |

TABLE C-8-continued

MATCHING RESULTS

| RecordID | FieldID1 | FieldID2 | FieldID3 | Partition of target table | Matching target RecordID(s) |
|---|---|---|---|---|---|
| 11 | 6 | 105 | 207 | — | — |
| 12 | 30 | 109 | 202 | — | — |
| 13 | 25 | 107 | 221 | — | — |
| 14 | 1 | 105 | 221 | 2 | — |
| 15 | 27 | 108 | 200 | 1 | — |

The method described above may be used, with minor modifications, in cases in which certain fields may contain multiple terms for each record. If the target table contains several terms in each record of the field, then the Boolean location vectors for each field are determined by taking the conjunction of the vectors for the individual terms. If the source table contains several terms in each record of the field, then the disjunction of Boolean location vectors of the terms in the field are computed.

For example, assume that source table C-6 contains a second term in each record of FieldID1:

TABLE C-9

MULTI-TERM SOURCE TABLE

| RecordID | FieldID1 | FieldID2 | FieldID3 |
|---|---|---|---|
| 1 | 6, 12 | 107 | 221 |
| 2 | 27, 25 | 105 | 200 |
| 3 | 1, 30 | 107 | 203 |
| 4 | 1, 30 | 105 | 221 |
| 5 | 25, 7 | 109 | 205 |
| 6 | 30, 12 | 109 | 203 |
| 7 | 7, 6 | 106 | 221 |
| 8 | 27, 12 | 108 | 201 |
| 9 | 12, 1 | 107 | 203 |
| 10 | 12, 6 | 105 | 207 |
| 11 | 6, 27 | 105 | 207 |
| 12 | 30, 25 | 109 | 202 |
| 13 | 25, 27 | 107 | 221 |
| 14 | 1, 6 | 105 | 221 |
| 15 | 27, 30 | 108 | 200 |

The resulting Boolean location vectors for the records of the above source table will have the following form:

TABLE C-10

BOOLEAN LOCATION VECTORS BY DISJUNCTION

| RecordID | FieldID1 | FieldID2 | FieldID3 | Resulting BLV |
|---|---|---|---|---|
| 1 | 6 ⇒00110 ∨ 12 ⇒10011 10111 | 107 ⇒00111 | 221 ⇒01110 | 10111 &00111 &01110 00110 |
| 2 | 27 ⇒10101 ∨ 25 ⇒00001 10101 | 105 ⇒11000 | 200 ⇒10001 | 10101 &11000 &10001 10000 |
| 3 | 1 ⇒11000 ∨ 30 ⇒01000 11000 | 107 ⇒00111 | 203 ⇒01001 | 11000 &00111 &01001 00000 |
| 4 | 1 ⇒11000 ∨ 30 ⇒01000 11000 | 105 ⇒11000 | 221 ⇒01110 | 11000 &11000 &01110 01000 |
| 5 | 25 ⇒00001 ∨ 7 ⇒00011 00011 | 109 ⇒11001 | 205 ⇒10000 | 00011 &11001 &10000 00000 |
| 6 | 30 ⇒01000 ∨ 12 ⇒10011 11011 | 109 ⇒11001 | 203 ⇒01001 | 11011 &11001 &01001 01001 |
| 7 | 7 ⇒00011 ∨ 6 ⇒00110 00111 | 106 ⇒00011 | 221 ⇒01110 | 00111 &00011 &01110 00010 |
| 8 | 27 ⇒10101 ∨ 12 ⇒10011 10111 | 108 ⇒10100 | 201 ⇒10010 | 10111 &10100 &10010 10000 |
| 9 | 12 ⇒10011 ∨ 1 ⇒11000 11011 | 107 ⇒00111 | 203 ⇒01001 | 11011 &00111 &01001 00001 |
| 10 | 12 ⇒10011 ∨ 6 ⇒00110 10111 | 105 ⇒11000 | 207 ⇒10000 | 10111 &11000 &10000 10000 |
| 11 | 6 ⇒00110 ∨ 27 ⇒10101 10111 | 105 ⇒11000 | 207 ⇒10000 | 10111 &11000 &10000 10000 |
| 12 | 30 ⇒01000 ∨ 25 ⇒00001 01001 | 109 ⇒11001 | 202 ⇒00100 | 01001 &11001 &00100 00000 |
| 13 | 25 ⇒00001 ∨ 27 ⇒10101 10101 | 107 ⇒00111 | 221 ⇒01110 | 10101 &00111 &01110 00100 |
| 14 | 1 ⇒11000 ∨ 6 ⇒00110 11110 | 105 ⇒11000 | 221 ⇒01110 | 11110 &11000 &01110 01000 |
| 15 | 27 ⇒10101 ∨ 30 ⇒01000 11101 | 108 ⇒10100 | 200 ⇒10001 | 11101 &10100 &10001 10000 |

As a result of the above changes, the processor will search for matches to certain of the source records in different partitions of the target table from those indicated by Table C-7.

APPENDIX D

Summary Probabilities of Term Appearance

The tables below present four examples for n=40 and for different values of $P_i$:

TABLE D-1

PROBABILITIES FOR n = 40 AND $P_i$ = 0.01

| k | $p_i(n, k)$ | $P_i^{\Sigma}(n, k)$ |
|---|---|---|
| 0 | 0.668971 | |
| 1 | 0.270292 | 0.668971 |
| 2 | 0.053239 | 0.939263 |
| 3 | 0.006812 | 0.992502 |
| 4 | 0.000636 | 0.999314 |
| 5 | | 0.999950 |

TABLE D-2

PROBABILITIES FOR n = 40 AND $P_i$ = 0.001

| k | $p_i(n, k)$ | $P_i^\Sigma(n, k)$ |
|---|---|---|
| 0 | 0.960770 | |
| 1 | 0.038469 | 0.960770 |
| 2 | 0.0007508 | 0.999239 |
| 3 | 0.0000095 | 0.9999898 |
| 4 | | 0.9999993 |

TABLE D-3

PROBABILITIES FOR n = 40 AND $P_i$ = 0.0001

| k | $p_i(n, k)$ | $P_i^\Sigma(n, k)$ |
|---|---|---|
| 0 | 0.9960078 | |
| 1 | 0.0039844 | 0.9960078 |
| 2 | 0.0000077 | 0.9999922 |
| 3 | | 0.9999999 |

TABLE D-4

PROBABILITIES FOR n = 40 AND $P_i$ = 0.00001

| k | $p_i(n, k)$ | $P_i^\Sigma(n, k)$ |
|---|---|---|
| 0 | 0.999600 | |
| 1 | 0.0003998 | 0.999600 |
| 2 | 0.00000008 | 0.9999998 |
| 3 | | 0.99999988 |

It can be seen in the tables that $k_{min}^{(i)}=2$ only for $P_i=0.01$. For smaller values of $P_i$, $k_{min}^{(i)}=1$, i.e., any appearance of such terms in the category is considered to be significant.

The invention claimed is:

1. A computer-implemented method for processing data, comprising:
receiving an initial set of records comprising initial terms describing respective items in specified categories; calculating, based on the initial set of records, respective term weights for at least some of the initial terms with respect to at least some of the categories, each term weight indicating, for a given initial term and a given category, a likelihood that a record containing the given initial term belongs to the given category, wherein calculating term weights comprises computing a general probability of occurrence of the given initial term over all of the categories, computing a specific probability of the occurrence of the given initial term in the records belonging to the given category, and determining the term weight responsively to a difference between the specific probability and the general probability for the given initial term with respect to the given category;
receiving a new record, not included in the initial set, the new record comprising particular terms, wherein the particular terms are a subset of the initial terms;
computing respective assignment metrics for two or more of the categories using the respective term weights of the particular terms in the new record with respect to the two or more of the categories; and
classifying the new record in one of the two or more of the categories responsively to the assignment metrics.

2. The method according to claim 1, wherein determining the term weight comprises setting the term weight for the given initial term with respect to the given category to zero unless the specific probability is higher than the general probability.

3. The method according to claim 2, wherein setting the term weight comprises determining, responsively to the general probability, a minimal number of occurrences of the given initial term within the given category, and setting the term weight to a non-zero value only if the given initial term occurs in at least the minimal number of the records in the given category.

4. The method according to claim 1, wherein computing the respective assignment metrics comprises building a contingency table containing the term weights indexed by the terms and by the categories, and selecting the categories and term weights to use in computing the respective assignment metrics from the contingency table.

5. The method according to claim 1, wherein computing the respective assignment metrics comprises calculating, for each of the two or more of the categories, a respective sum of the respective term weights of the particular terms in the new record, and wherein classifying the new record comprises assigning the new record to the one of the two or more of the categories having the greatest respective sum.

6. The method according to claim 5, wherein the records comprise multiple fields, and wherein calculating the respective sum comprises computing a weighted sum of the respective term weights over the multiple fields.

7. Apparatus for processing data, comprising: a memory, which is arranged to hold an initial set of records comprising initial terms describing respective items in specified categories; and a processor, which is arranged to:
calculate, based on the initial set of records, respective term weights for at least some of the initial terms with respect to at least some of the categories, each term weight indicating, for a given initial term and a given category, a likelihood that a record containing the given initial term belongs to the given category, wherein calculating term weights comprises computing a general probability of occurrence of the given initial term over all of the categories, computing a specific probability of the occurrence of the given initial term in the records belonging to the given category, and determining the term weight responsively to a difference between the specific probability and the general probability for the given initial term with respect to the given category;
receive a new record, not included in the initial set, the new record comprising particular terms, wherein the particular terms are a subset of the initial terms;
compute respective assignment metrics for two or more of the categories using the respective term weights of the particular terms in the new record with respect to the two or more of the categories; and
classify the new record in one of the two or more of the categories responsively to the assignment metrics.

8. The apparatus according to claim 7, wherein the processor is arranged to set the term weight for the given term with respect to the given category to zero unless the specific probability is higher than the general probability.

9. The apparatus according to claim 8, wherein the processor is arranged to determine, responsively to the general probability, a minimal number of occurrences of the given initial term within the given category, and to set the term weight to a non-zero value only if the given initial term occurs in at least the minimal number of the records in the given category.

10. The apparatus according to claim 7, wherein the processor is arranged to build a contingency table containing the term weights indexed by the terms and by the categories, and to select the categories and term weights to use in computing the respective assignment metrics from the contingency table.

11. The apparatus according to claim 7, wherein the processor is arranged to calculate, for each of the two or more of the categories, a respective sum of the respective term weights of the particular terms in the new record, and to assign the new record to the one of the two or more of the categories having the greatest respective sum.

12. A computer software product, comprising a computer-readable medium in which program instructions are stored, which instructions, when read by the computer, cause the computer to:

receive an initial set of records comprising initial terms describing respective items in specified categories, and to calculate, based on the initial set of records, respective term weights for at least some of the initial terms with respect to at least some of the categories, each term weight indicating, for a given initial term and a given category, a likelihood that a record containing the given initial term belongs to the given category, wherein calculating the term weight for the given initial term comprises computing a general probability of occurrence of the given initial term over all of the categories, computing, a specific probability of the occurrence of the given initial term in the records belonging to the given category, and determining the term weight responsively to a difference between the specific probability and the general probability for the given initial term with respect to the given category;

receive a new record, not included in the initial set, the new record comprising particular terms, wherein the particular terms are a subset of the initial terms;

compute respective assignment metrics for two or more of the categories using the respective term weights of the particular terms in the new record with respect to the two or more of the categories; and classify the new record in one of the two or more of the categories responsively to the assignment metrics.

13. The product according to claim 12, wherein the instructions cause the computer to set the term weight for the given initial term with respect to the given category to zero unless the specific is higher than the general probability.

14. The product according to claim 13, wherein the instructions cause the computer to determine, responsively to the general probability, a minimal number of occurrences of the given initial term within the given category, and to set the term weight to a non-zero value only if the given initial term occurs in at least the minimal number of the records in the given category.

15. The product according to claim 12, wherein the instructions cause the computer to build a contingency table containing the term weights indexed by the terms and by the categories, and to select the categories and term weights to use in computing the respective assignment metrics from the contingency table.

16. The product according to claim 12, wherein the instructions cause the computer to calculate, for each of the two or more of the categories, a respective sum of the respective term weights of the particular terms in the new record, and to assign the new record to the one of the two or more of the categories having the greatest respective sum.

17. The product according to claim 16, wherein the records comprise multiple fields, and wherein the instructions cause the computer to compute a weighted sum of the respective term weights over the multiple fields.

* * * * *